US010678924B2

(12) United States Patent
Le Roy et al.

(10) Patent No.: US 10,678,924 B2
(45) Date of Patent: Jun. 9, 2020

(54) HARDWARE-BASED SOFTWARE-RESILIENT USER PRIVACY EXPLOITING EPHEMERAL DATA RETENTION OF VOLATILE MEMORY

(71) Applicant: QUALCOMM Incorporated, San Diego, CA (US)

(72) Inventors: Vincent Pierre Le Roy, San Diego, CA (US); Ivan McLean, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 202 days.

(21) Appl. No.: 15/233,478

(22) Filed: Aug. 10, 2016

(65) Prior Publication Data
US 2018/0046805 A1     Feb. 15, 2018

(51) Int. Cl.
*G06F 11/00*     (2006.01)
*G06F 12/14*     (2006.01)
(Continued)

(52) U.S. Cl.
CPC .............. *G06F 21/567* (2013.01); *G06F 1/30* (2013.01); *G06F 3/0619* (2013.01);
(Continued)

(58) Field of Classification Search
CPC ........ G06F 21/567; G06F 1/30; G06F 3/0619; G06F 3/0653; G06F 3/0685; G06F 21/6245; G06F 2221/034
See application file for complete search history.

(56) References Cited

U.S. PATENT DOCUMENTS

| 5,414,861 A | * | 5/1995 | Horning | .................... G06F 1/30 365/229 |
| 8,117,493 B1 | | 2/2012 | Fultz et al. | |

(Continued)

FOREIGN PATENT DOCUMENTS

| WO | WO-9725675 A1 | 7/1997 |
| WO | WO-2012122994 A1 | 9/2012 |
| WO | 2017014793 A1 | 1/2017 |

OTHER PUBLICATIONS

An in-depth analysis of the cold boot attack—R. Carbone, C. Bean, M.Salois—Jan. 2011 (Year: 2011).*

(Continued)

*Primary Examiner* — Mahfuzur Rahman
*Assistant Examiner* — Darshan I Dhruv
(74) *Attorney, Agent, or Firm* — Loza & Loza, LLP

(57) ABSTRACT

Various features relate to the providing Software-Resilient User Privacy within smartphones or other devices by storing and processing all pertinent values needed for user privacy—such as security keys and access attempt counters—in hardware, such as within a System-on-a-Chip (SoC) processor formed on an integrated circuit (IC). For example, an on-die ephemeral Volatile Memory (eVM) device may be employed for storing access attempt counters or other parameters used to control malicious attack countermeasures. In one example, the eVM employs static random-access memory (SRAM) formed on the die and exploits capacitive remanence to recover stored counter values even if power is disconnected, then reconnected. On-chip NVM may be used for permanent storage of other privacy values, such as a device-unique secret key that is generated locally on the device and not known to the chip vendor, the device Original Equipment Manufacturer (OEM)) or the owner/user of the device.

27 Claims, 14 Drawing Sheets

(51) Int. Cl.
*G06F 12/16* (2006.01)
*G08B 23/00* (2006.01)
*G06F 21/56* (2013.01)
*G06F 21/79* (2013.01)
*G06F 1/30* (2006.01)
*G06F 3/06* (2006.01)
*G06F 21/62* (2013.01)

(52) U.S. Cl.
CPC .......... *G06F 3/0653* (2013.01); *G06F 3/0685* (2013.01); *G06F 21/6245* (2013.01); *G06F 21/79* (2013.01); *G06F 2221/034* (2013.01)

(56) References Cited

U.S. PATENT DOCUMENTS

| | | | |
|---|---|---|---|
| 9,002,014 B2 | 4/2015 | Henry et al. | |
| 9,042,197 B2 | 5/2015 | Allison et al. | |
| 2001/0027421 A1* | 10/2001 | Komori | G06Q 20/367 705/75 |
| 2002/0178366 A1* | 11/2002 | Ofir | G06F 21/6245 713/182 |
| 2009/0300312 A1* | 12/2009 | Handschuh | G06F 12/1408 711/166 |
| 2011/0271144 A1* | 11/2011 | James | G06F 11/1441 714/14 |
| 2011/0275343 A1* | 11/2011 | Kollar | H04W 4/029 455/404.2 |
| 2012/0084573 A1* | 4/2012 | Rudelic | G06F 12/1466 713/193 |
| 2012/0311322 A1* | 12/2012 | Koyun | H04W 12/04 713/156 |
| 2012/0331292 A1* | 12/2012 | Haggerty | H04L 63/0272 713/168 |
| 2013/0212321 A1* | 8/2013 | Talagala | G06F 12/0246 711/103 |
| 2014/0108786 A1* | 4/2014 | Kreft | G06F 21/71 713/156 |
| 2014/0173357 A1* | 6/2014 | Anderson | G06F 11/0778 714/45 |
| 2014/0317417 A1* | 10/2014 | Ashkenazi | H04L 9/0866 713/189 |
| 2015/0248568 A1 | 9/2015 | Offenberg et al. | |
| 2016/0028725 A1* | 1/2016 | Benoit | H04L 63/0869 726/14 |
| 2016/0029220 A1 | 1/2016 | Obaidi | |
| 2016/0048462 A1 | 2/2016 | O'Loughlin et al. | |
| 2016/0055102 A1* | 2/2016 | de Cesare | H04L 9/0869 713/193 |
| 2016/0149696 A1* | 5/2016 | Winslow | H04L 9/0618 380/28 |
| 2016/0239663 A1* | 8/2016 | Healy | G06F 21/554 |
| 2017/0076096 A1* | 3/2017 | Challener | G06F 11/1469 |
| 2017/0250967 A1* | 8/2017 | Martineau | H04L 9/0866 |
| 2018/0225201 A1* | 8/2018 | Fevrier | G06F 11/1441 |

OTHER PUBLICATIONS

R. Carbone et al. "An in-depth analysis of the cold boot attack", Published on "Jan. 2011" (Year: 2011).*
International Search Report and Written Opinion—PCT/US2017/045334—ISA/EPO—dated Oct. 2, 2017.

* cited by examiner

*Exemplary memory operations for use on a processor formed on an integrated circuit (IC) die and equipped with eVM* — 1400

1402 — Generate a device-unique secret key and store in an NVM portion of memory on the IC die, the device-unique secret key not accessible to any entity or component external to the IC die, wherein software running on the processor has no access to the device-unique secret key.

1404 — Receive an access request from a user as a personal identification number (PIN) or other credential value, compare the input value with a stored (correct) value and, if no match, reject the access attempt and increment a counter value for use in time-delaying additional access requests and/or initiate a timer (or grant access to the user is there is a match between the input credential and the stored value).

1406 — If no match, encode the counter and/or timer value as binary codes using Hamming or other ECC codes and store within a VM providing ephemeral post-power loss data retention (i.e. an eVM aka a pNVM) on a System-on-a-Chip (SoC) IC die wherein the IC die receives power from an external power supply and the eVM includes (1) SRAM configured to provide a sufficient amount of capacitive (and/or magnetic) remanence to retain stored information following the power loss during a predetermined period of time, and/or (2) a set of capacitors formed on the IC die and configured to store information therein.

1408 — Receive another access request following a power loss to the IC die.

1410 — Retrieve information from the eVM following the power loss during a period of time in which the information is still retained in the memory device via remanence within the SRAM and/or via charge retained within the set of capacitors, while using ECC to detect and correct possible bit errors, then delay responding to the latest access attempt (at 1402) until completion of a delay specified by the timer/counter value.

1412 — Once there is a match (i.e. successful authentication), generate an end-key from the device-unique secret key for loading into a crypto block, which then releases content of the NVM to software.

*FIG. 14*

HARDWARE-BASED SOFTWARE-RESILIENT USER PRIVACY EXPLOITING EPHEMERAL DATA RETENTION OF VOLATILE MEMORY

BACKGROUND

Field of the Disclosure

Various features relate to wireless communication devices and to security procedures for use in securing such devices against unauthorized access.

Description of Related Art

Confidential user information often needs to be protected within wireless communication devices, such as smartphones or the like, despite a loss of power within such devices. Conventionally, some form of Non-Volatile Memory (NVM), i.e. a memory whose content is retained across power-loss, could be used to store such user information. At present, however, there does not appear to be any cost-effective on-die NVM solution for protecting user information on such devices. Therefore, user information, e.g. photos, documents, etc., is typically stored on an external non-volatile storage such as a Secure File System database. The information is cryptographically protected using a high entropy hardware key and is bound to user credentials, e.g. passphrases, fingerprints, etc.

FIG. 1 illustrates an exemplary system and procedure for cryptographically protecting information associated with a user 100, which is encrypted by a processor 102 for storage in an external NVM database 104 (which is external to the processor yet within the wireless device). Briefly, during an initial enrollment procedure shown in FIG. 1, a relatively short user personal identification number (PIN) or other passcode 106 is selected by the user and entered via software (SW) 108 running on the processor 102. The low-entropy passcode 106 is applied to a Hashed Message Authentication Code (HMAC) 110 configured within hardware (HW) 112, along with a high-entropy hardware unique key (HUK) 114 to encrypt the passcode for storage on the external storage device 104, where the encrypted passcode is represented in the figure as locked data 116.

Although the passcode of FIG. 1 is stored in an encrypted form via a high entropy HUK, the procedure nevertheless relies on the simple user passcode and so the system must defend against brute-force guessing attacks or other attacks, especially when the passcode or other user credential is in the form of a user secret whose entropy is limited, e.g. 4-digit PIN or the like. Other forms of attack include: software attacks directed against the software running on the main processor of the device; physical attacks directed at the connection of the processor and the external storage; and firmware attacks directed against the external storage components, such as a flash controller (not separately shown).

FIG. 2 broadly illustrates these exemplary attacks. A user 200 of a device employing a processor 202 provides a passcode to the processor, which controls the storage of user information in a database 204. Guessing attacks 206 are directed to guessing the passcode (by repeatedly trying different passcodes until the correct one is entered). Software attacks 208 are directed against software running on the processor. Physical attacks 210 are directed against bus lines interconnecting the processor 202 and the storage device 204. Firmware attacks 212 are directed against the storage device 204 itself. For example, Replay Protected Memory Blocks (RPMBs) are vulnerable to physical attacks on the flash die or firmware attacks on the flash controller. Fairly strong protection nevertheless can be provided against software, physical and firmware attacks by using high entropy encoding or other sophisticated countermeasures. However, guessing attacks are problematic within devices that use simple PIN codes or the like, whereby an attacker repeatedly applies different passcodes to the device in an attempt to guess the short passcode. Traditional countermeasures against such attacks include limiting the number of trials via an access attempt counter or by controlling the authentication access speed: e.g. "time-spacing" access attempt trials via a timer controlled by a counter or by using a structurally slow algorithm while deriving a digest key from an input passcode. Structural slowness can deter attacks by rerouting some operations on a high-speed processor of the device to discourage guessing attacks by imposing a constant time delay (or duration) to all access attempts.

FIG. 3 illustrates exemplary traditional countermeasures that may be exploited during an authentication procedure in which a user seeks to store or retrieve information from the database of the wireless device. Briefly, the user 300 applies the short passcode 306 to the processor 302 in an attempt to access the storage device 304. The passcode is routed by SW 308 to HW 312 where it is applied along with an HUK 310 to an HMAC 314 to generate a hashed value that is compared at 316 with the previously stored hashed version of the passcode 318 retrieved from the storage device 304 (where the comparison may be subject to a time delay imposed by a wait device 322 based on a counter value 324, as discussed below). The input passcode is also applied to a key derivation function (KDF) 326 that generates another key 328, referred to herein as the end-key.

Assuming the correct passcode has been entered by the user, the hash value output from HMAC 314 will match the hashed passcode 318 retrieved from external memory. The end-key 328 is then applied via a gate 330 to a HW cryptographic function 332 for use in encrypting user information for storage in the external device 304 (as locked data 336) or for decrypting previously-stored information for outputting to the user as unlocked data 338. (Although not shown, additional cryptographic operations or derivations may be employed in SW following the hash match and before the encrypted data is unlocked in HW using the end-key. That is, one or more SW components may be interposed between gate 330 and crypto device 332 before the end-key is fully generated.)

Conversely, if the input passcode 306 is incorrect, the hash comparison at 316 will fail and the end-key will not be applied to encrypt or decrypt the stored data. One or more SW components 340 are provided to reject the user access and increment counter 324. To prevent the attacker from immediately repeating the access attempt with a different passcode, a SW wait component 322 is interposed prior to comparison component 316 to delay the comparison. The wait component 322 may be configured, for example, as a simple timer. Each time a newly-entered passcode fails, the counter 324 is incremented, which is used to control the next waiting period. The waiting period may be increased significantly with each increment of the counter to discourage repeated guessing attacks. The counter 324 is stored in the external storage device; otherwise the attacker would simply turn the device off, then back on, thereby cycling the power to the processor and resetting or "rolling back" any counters stored in volatile memory on the processor itself. Note also that the wait is imposed before comparison 316 is made. If the delay were imposed after the comparison, then there might not be any delay imposed following power up if a correct passcode is entered and hence the attacker may not be discouraged from repeatedly power cycling the device and entering guessed passwords.

Additional delays may be imposed using the KDF 326. For example, a structurally slow algorithm may be applied on the PIN via the KDF 326. Components of the KDF 326 may be configured, e.g., to calculate a mathematical value (such as a) to some number of digits to thereby impose a time delay whenever a new passcode is entered. As this delay is not bypassed but is instead applied whenever a passcode is entered (either by an attacker or a legitimate user), it cannot be used excessively, otherwise user experience may be impacted negatively.

Thus, at least some countermeasures employ non-volatile secure counters (such as counter 324 of FIG. 3) to defeat the rollback attacks involving power-cycling or resetting the system. Providing counters on the external storage device may make those counters vulnerable to attacks that would reset the values, such as firmware attacks on a flash controller (not shown). Moreover, as illustrated in FIG. 3, software may be heavily involved in the user authentication process, sometimes with visibility on the cryptographic keys. As such, user information can be vulnerable to software compromised by an attacker or even to legitimate software (signed by the owner of the device Root-of-Trust (RoT), e.g. the Original Equipment Manufacturer (OEM)), which would expose the key or circumvent the countermeasures against guessing attacks.

There is thus a need to provide solutions to these and other issues to provide devices that are resilient to software attacks on confidential user information or other information that needs to be protected. Herein, an exemplary system or procedure directed to these and other ends is referred to as providing Software-Resilient User Privacy.

SUMMARY

In one aspect, a method is provided that is operational in a processor formed on an integrated circuit (IC) die, the method including: storing a parameter in a volatile memory on the IC die, wherein the volatile memory receives power from a power source; retrieving the parameter from the volatile memory after reactivation of power following a loss of power from the power source; and controlling an attack countermeasure based on the parameter retrieved from the volatile memory following the reactivation of power.

In another aspect, a device includes: a power source; and an IC die including a processor, the processor configured to: store a parameter in a volatile memory on the IC die, wherein the volatile memory receives power from the power source; retrieve the parameter from the volatile memory after reactivation of power following a loss of power from the power source; and control an attack countermeasure based on the parameter retrieved from the volatile memory following the reactivation of power.

In yet another aspect, a device includes: means for storing a parameter in a volatile memory on an IC die, wherein the volatile memory receives power from a power source; means for retrieving the parameter from the volatile memory after reactivation of power following a loss of power from the power source; and means for controlling an attack countermeasure based on the parameter retrieved from the volatile memory following the reactivation of power.

BRIEF DESCRIPTION OF THE DRAWINGS

FIG. 14 further illustrates exemplary procedures that exploit an on-chip eVM.

DETAILED DESCRIPTION

Figure 1:
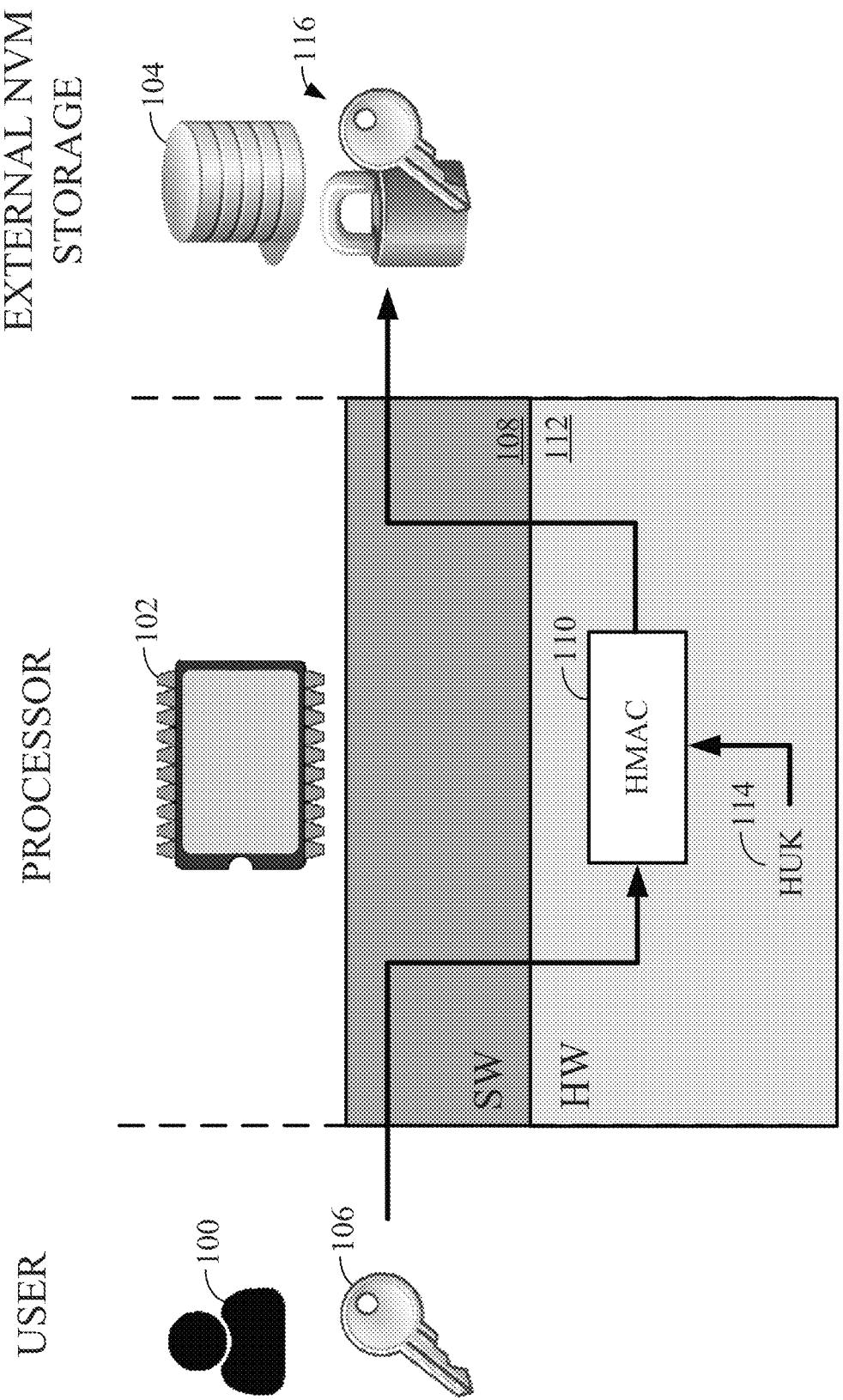
FIG. 1 illustrates an exemplary computing system equipped with a processor and external memory and summarizes a procedure for enrolling a user with a passcode so that confidential user information may be stored thereafter on the external storage device.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to devices and methods for use with wireless communication devices or other computing devices. In particular, Software-Resilient User Privacy may be achieved or enhanced by storing and processing all pertinent values needed for user privacy—such as security keys and access attempt counters—in hardware, such as within the SoC IC of smartphones or other devices. This may be achieved in some examples by exploiting on-die or on-chip volatile memory (VM) from which data is retrieved following a power loss by, e.g., exploiting capacitive remanence or other ephemeral data retention capabilities of the memory device. The on-chip VM stores at least some parameters used for protecting user confidential information such as access attempt counters. Conventionally, such values would be stored off-chip and thus vulnerable to rollback attacks or the other problems discussed above. By storing the values on-chip, privacy is enhanced by reducing the risk of rollback attacks or the like.

In examples described herein, the on-chip VM includes memory components that retain values temporarily or ephemerally even if power is disconnected from the memory component (e.g. if power is disconnected from the SoC within which the on-chip VM is formed). That is, the on-chip VM is a memory device that does not retain values permanently (or substantially permanently) upon power loss but retains at least some values for at least some relatively short period of time (ephemerally) after power is no longer applied to the memory device and retains those values in a manner sufficient to allow the values to be read from the memory device during that period of time. Herein, the on-chip VM from which values can be retrieved following power loss is referred to as an ephemeral VM (or eVM) to emphasize that ephemeral data retention features of the VM are exploited to retain or recover information across a power loss.

The eVM differs from NVM, wherein values are retained more or less permanently even if power is no longer applied. The eVM also differs from any forms of VM where values are lost immediately (or substantially immediately) upon loss of power and cannot be recovered (at least without sophisticated and burdensome recovery techniques). Hence, the on-chip eVM provides a degree of post-power loss data retention between conventional NVM where values are retained for long periods without power and any VM devices where values are lost substantially immediately upon power loss. The eVM also may be referred to as a "pseudo-NVM" (or pNVM) since it provides a degree of non-volatility to the information stored therein. That is, although the eVM device is a type of volatile memory, the use of ephemeral data retention capabilities of the eVM device exploits features normally associated with NVM, at least ephemerally.

In one example, the eVM component employs otherwise conventional static random-access memory (SRAM) on the die to store counters or timeout values and exploits inherent remanence within such devices to retain the values for some period of time even after power is disconnected. The remanence may be a capacitive form of remanence that does not require any special read techniques to read out the remnant values. That is, the SRAM can be read using an otherwise conventional read operation. Within such SRAM devices, the values should be stored for an amount of time sufficient to invoke the remanence effect so that values can thereafter be read out. This will depend on the particular SRAM device and otherwise routine experimentation may be performed, if needed, to determine the amount of time. Additionally or alternatively, a form of magnetic remanence might be employed, although it is generally more difficult to obtain values from a memory device that are retained only via magnetic remanence. Nevertheless, depending upon the particular device in which the eVM is employed, and the overall needs of the system, the exploitation of magnetic remanence may be useful.

To prevent an attacker from powering off the device before values in SRAM have achieved sufficient remanence, it may be useful to provide circuitry or other components that continue to apply voltage to the SRAM after power off for a sufficient time to invoke remanence, such as by providing a capacitor to hold the voltage on the SRAM for a suitable period of time after the processor is otherwise powered off. Note that such a capacitor need not provide sufficient charge to hold the voltage of the SRAM throughout the entire power-off period (otherwise remanence would not be needed). Rather the capacitor need only hold the voltage long enough after power-off to invoke remanence effects within the SRAM. This amount of time may depend, of course, on the particular SRAM used and other factors. Such a capacitor need not be formed on the same chip as the SRAM. Additionally or alternatively, the eVM itself may consist of one or more capacitors formed on the IC die for individually or collectively storing the bits of a counter or other parameter by retaining charge for some sufficient period of time after power to the IC has been disconnected. This may require fairly large circuit space. Generally speaking, the use of any additional capacitors is disfavored due to increased cost, though such capacitors may be employed in some examples.

The duration by which an eVM retains data via remanence may depend on various factors such as temperature. Exemplary remanence-based eVM devices may, for example, allow for retrieval of data following power loss at room temperature of several minutes to several hours and, in some examples, from one minute to one hour. The retention duration for remanence will likely be shorter at the higher operating temperatures associated with the processors of wireless devices. For a particular eVM and for a particular wireless device, those skilled in the art can determine the expected ephemeral data retention duration for the VM. As discussed below, error correction codes (ECC) may be used to compensate for bit loss due to fading of remanence.

By storing access attempt counter parameters or other suitable values on chip in eVM and retaining those values across power-loss, the risk of rollback attacks or the like is reduced so as to enhance overall user privacy and the confidentiality of user data. Note that NVM 410 additionally may be used for permanent storage of other parameters for use in achieving Software-Resilient User Privacy, such as for storing a device-unique secret key that is generated locally on the device and not known to anyone, including the chip vendor, the device OEM, and the owner/user of the device.

Figure 4:
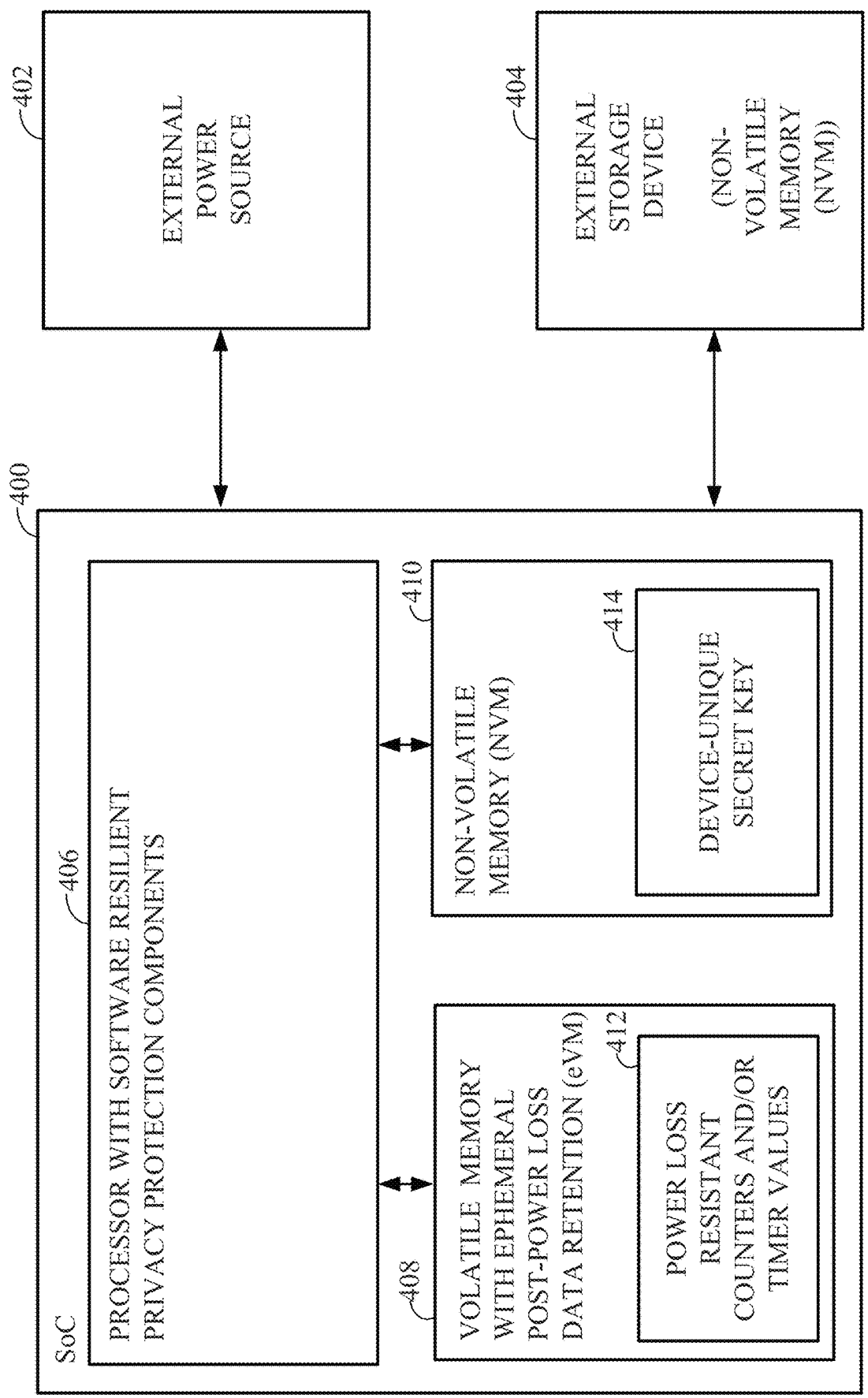
FIG. 4 is a block diagram illustrating exemplary components of a System-on-a-Chip (SoC) having on-die or on-chip volatile memory (VM) from which data is retrieved despite a power loss (such as a VM device capable of retaining values ephemerally following loss of power, herein referred to as an "eVM") and a separate NVM, wherein countermeasures are applied that exploit the eVM to provide Software Resilience.

FIG. 4 provides a high-level block diagram illustrating a SoC 400 provided with both on-die eVM and on-die NVM, where the eVM is a VM providing ephemeral post-power loss data retention. Briefly, the SoC 400 is coupled to an external power supply or power source 402 such as a rechargeable battery and to an external NVM storage device 404 such as a flash drive. The SoC 400 includes a processor 406 equipped with Software-Resilient User Privacy components to be described in detail below that provide access to user information that is encrypted and stored on storage device 404. The processor 406 stores attack countermeasure control parameters or other information, as needed, within either an eVM device 408 or a NVM device 410. The eVM device 408 (i.e. a volatile memory device with ephemeral post-power loss data retention) may be used, for example, to store counter or timer values 412 for use in controlling time-delay countermeasures that restrict access to the storage device 404. Such power loss resistant values may be used in connection with processor-controlled power-cycling countermeasures against guessing or rollback attacks by, e.g., limiting the number of trials via a counter value or by controlling the authentication access speed via a timer value.

Upon loss of power from the external power source 402, which may occur whenever the device is powered off (either by an authorized user in the course of normal device usage or by an unauthorized attacker seeking to trigger certain malicious attacks), the eVM 408 will retain values (at least temporarily) so those values may be accessed by the processor 404 once power is re-applied to the SoC. In this manner, resilience against certain types of attacks is provided. Additionally, certain values may be permanently stored in the NVM device 410 of the processor, such as a device-unique secret key 414 from which other keys (e.g. end-keys) may be generated.

In one example, an SoC equipped with both eVM and NVM may provide an overall Software-Resilient User Privacy solution that includes:

1) An end-to-end key flow in hardware, anchored by a device-unique secret key that is generated locally on the device and is not known to anyone, including the chip vendor, the device OEM, and the owner/user of the device. Once generated, the key is permanently stored on chip using NVM. Software only has visibility on, or access to, the credentials of the user (e.g. user password, PIN, etc.) and not the device-unique key or an end-key/digest key generated based on the device-unique key). Hardware releases the end-key (to other secure HW components) only upon successful user authentication, and otherwise induces an increasing time penalty before the next trial to discourage guessing attacks or the like.
2) A "structurally slow" algorithm that is sequenced by hardware, e.g. multiple rounds of key derivation, and where key derivation begins with the hardware device-unique key and uses user credentials as derivation parameters to generate the end-key.
3) Throttling of trials in hardware using the on-die eVM for the counters employed to throttle the trials. Notably, the counters do not need to be truly non-volatile. They need to be retained only as long as a maximum time penalty to be imposed, which is typically on the order of hours or days. Accordingly, if a power-loss is shorter than the retention capability of the eVM, then the counters are preserved and the penalty resumes when power is restored, thus discouraging attacks. [Note that if the power-loss extends beyond the retention capability of the eVM, then the maximum penalty has already been satisfied anyway. In that case, the counters are lost and so the system returns to its default state, likely the minimum penalty, which could be used by an attacker to reset the penalty. As such, the eVM solution does not guarantee a monotonically increasing penalty. However it can achieve a minimum average penalty (e.g. a mean of the minimum and maximum penalty), which is typically acceptable for enhancing user privacy protection and for achieving other advantages.]

Figure 5:
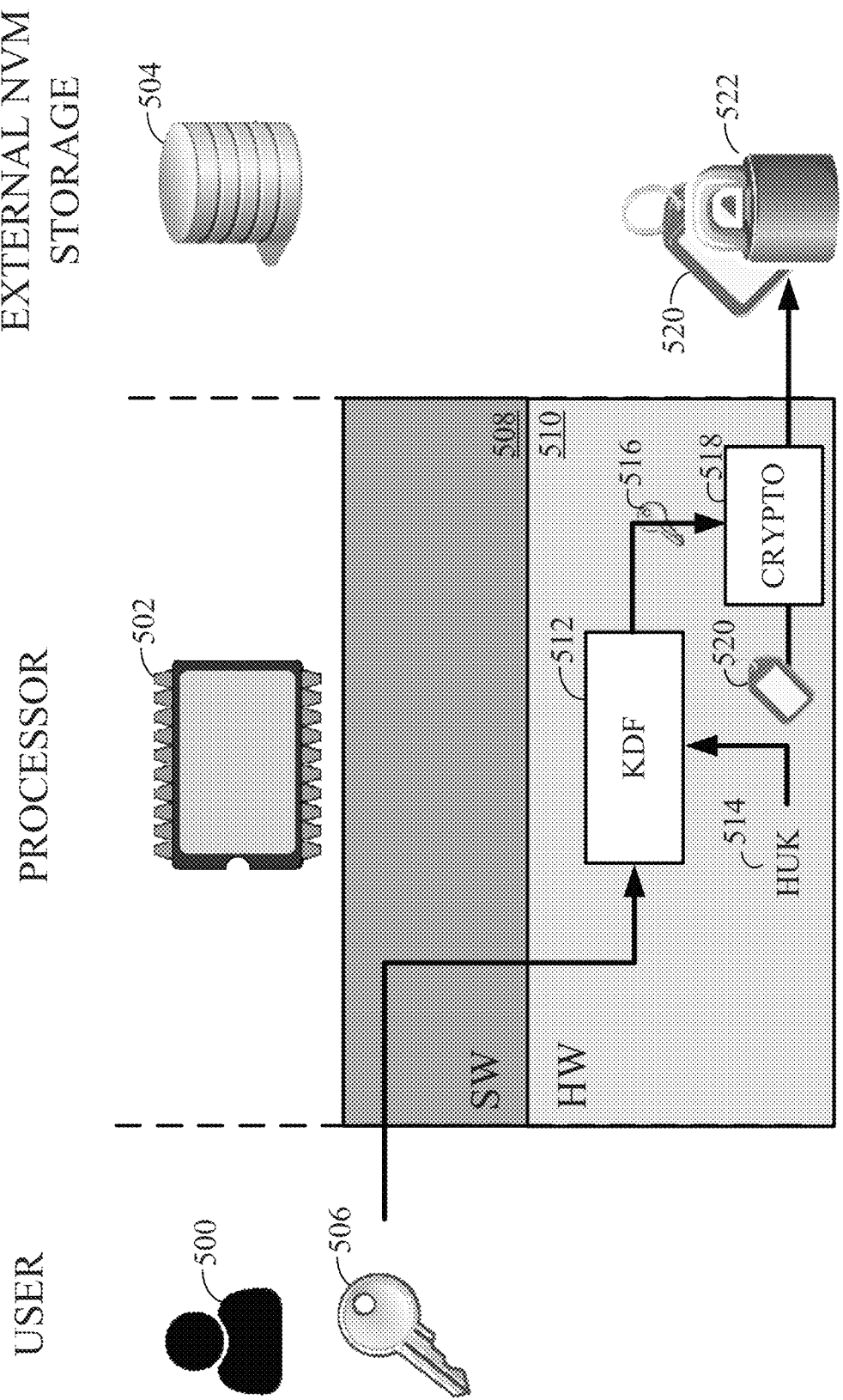
FIG. 5 further illustrates aspects of the computing system of FIG. 4 and summarizes a Software Resilient procedure for enrolling a user with a passcode.
Figure 6:
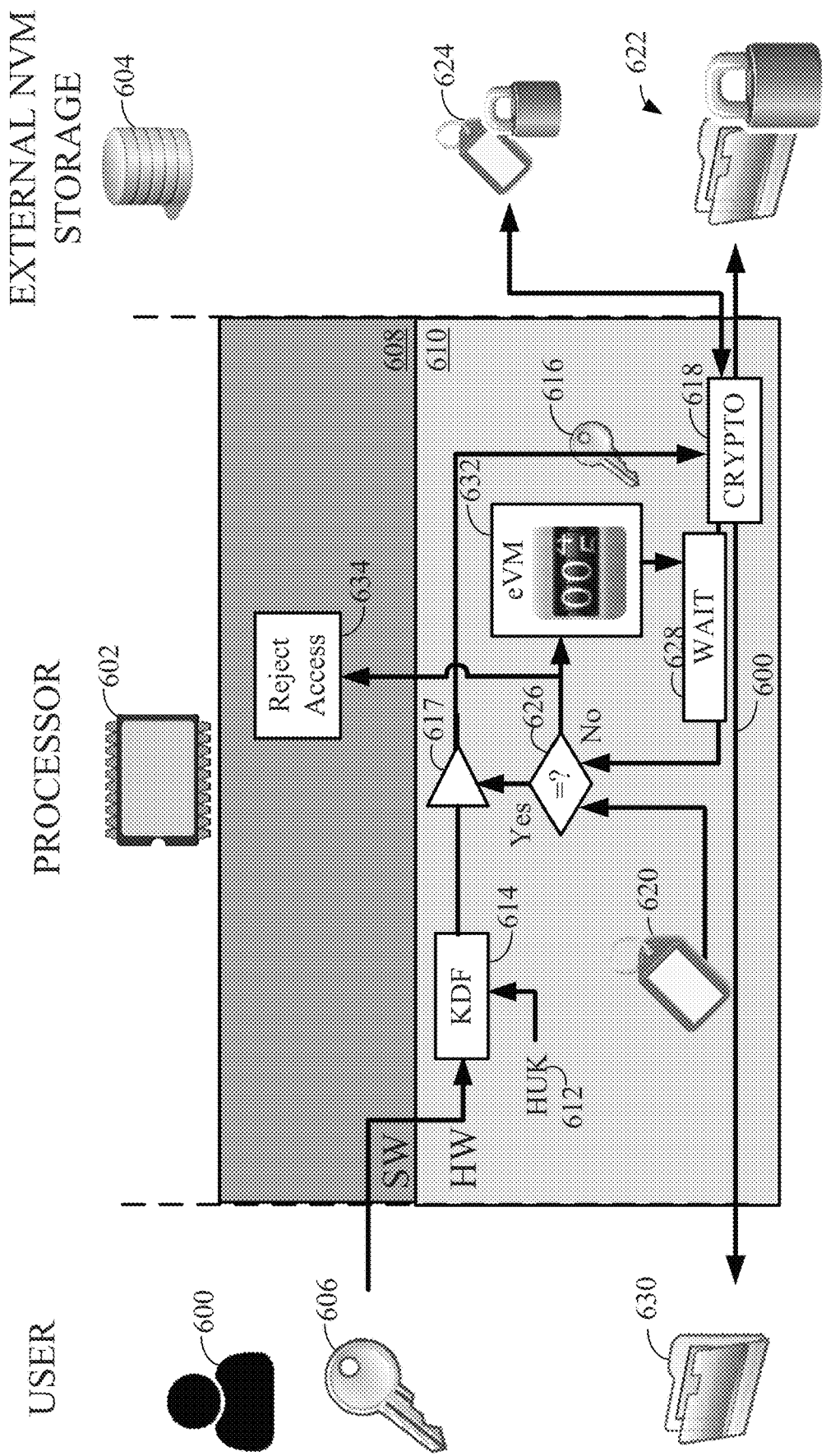
FIG. 6 further illustrates aspects of the system of FIG. 4 and summarizes a procedure for authenticating the user before confidential user information may be accessed, wherein Software Resilient countermeasures exploit the eVM.

FIGS. 5 and 6 summarize some of these features. Within FIG. 5, during an enrollment procedure for a wireless device, a user 500 applies a passcode to a processor 502 of the device for saving the passcode in an encrypted form in an external memory 504 (i.e. external to the processor yet within the wireless device). Briefly, during the enrollment procedure, a relatively short user PIN or other passcode 506 is selected by the user and entered via SW 508 on the processor 502, then relayed to HW 510. The low-entropy passcode 506 is applied to a KDF 512, which also receives a HUK 514 (generated by components not shown in FIG. 5) and which may employ a structurally slow algorithm. The HUK 514 is not known to the user or any other entity, including the device manufacturer. An end-key or digest key 516 generated by the KDF 512 is applied via a HW cryptographic function 518 along with a hash or a simple fixed value 520 to encrypt the passcode for storage in device 504 as locked/hashed passcode data 522. Note that the output key (i.e. key 516) should be dependent on the output of the structurally slow algorithm, otherwise it could be bypassed if rerouted to another processor. Note also that in FIG. 5, hash operations employing an HW HMAC or the like are not shown in detail (such as the HMAC function of FIGS. 1 and 3, discussed above). Rather, the hash is shown symbolically in FIG. 5 as tag 520. Still further, note that the PIN 506 in this example is already factored into the digest key 516. Re-injecting the PIN 506 at the crypto 518 stage might weaken the cryptographic strength by introducing some correlation, and so a simple fixed value for use as value 520 may be preferred or a hash tag. Finally, note that enrollment is performed without exposing any of the internal keys (i.e. the end-key and the HUK) to SW 508.

FIG. 6 illustrates exemplary countermeasures that may be exploited when using eVM during an authentication procedure in which a user seeks to access the database of the wireless device. Briefly, the user 600 applies the short passcode key 606 to the processor 602 in an attempt to access storage device 604. The passcode is relayed from SW 608 to HW 610 and then applied along with an HUK 612 to a KDF 614 to generate an end-key 616 that can be applied via a gate 617 to a cryptographic device 618 to encrypt or decrypt data 622 on the storage device 604. Encryption or decryption of data using the end-key is only performed if a hash 620 generated based on the input passcode 606 matches the corresponding locked hash 624 generated during the enrollment procedure of FIG. 5 and retrieved from the external memory 604. The two hash values are compared using comparison function 626. (As in FIG. 5, the details of the hash function operations are not shown in FIG. 6 and the hash is represented by a tag 620.) Notably, the comparison at 626 is subject to a delay imposed by a HW wait function 628, which may be a simple timer controlled by a counter value, initially set to zero).

Assuming the correct passcode has been entered, the two hash values will match at 626 (i.e. "yes"), and user data can then be encrypted or decrypted, as needed, using the end-key 616 output from the KDF 614 and applied to a cryptographic function 618 via a gate 617 for storage as locked data 622 or output as unlocked data 630. However, if the compared values do not match (i.e. the passcode was wrong), an eVM counter 632 is incremented and SW 608 is notified to inform the user that accessed has been rejected (via a SW reject access component 634). The incremented counter value will then serve to delay a next access attempt via wait component 628. The length of the delay may increase with each incorrect passcode, as controlled by the incremented counter value. In some examples, the system may impose no wait penalty for the first three failing attempts, then apply a maximum penalty.

The counter 632 is stored in eVM to prevent an attacker from resetting the counter to zero by power cycling the device. The device is thus substantially immune from power-cycling roll-back attacks that would otherwise reset the counter value. Other suitable values maybe stored via the eVM, such as timer values. Configuring the counter in HW on the chip also helps protect the counter from tampering, which might otherwise be possible if stored in external memory. Note that the wait is imposed before comparison 626 is made. If the delay were imposed after the comparison, then there might not be any delay imposed following power up if a correct passcode is entered and hence the attacker may not be discouraged from repeatedly power cycling the device and entering guessed passwords. Still further, note that all of the cryptographic and hash operations are performed in HW 610 with no exposure of the end-key or the HUK to SW 608.

An exemplary procedure using the components of FIG. 6 may be as follows:
1. Gate the end-key (using gate 617)
2. Wait for an authentication request (from SW 608)
3. Obtain current time penalty (based on latest counter value 632 in eVM)
   # error-corrected, default if failed correction
4. Increase time penalty (by incrementing counter 632 in eVM)
   # in case of power-loss during authentication
   # the longer in SRAM, the more remanent
5. Wait until time penalty is fulfilled
6. If passed, check credentials
   # load the key
7. If successful, reinitialize time penalty in eVM (by resetting counter 632)
   # loaded key is valid; access granted
8. Loop to 2 to wait for a next authentication request.

As noted, one implementation of the on-die eVM is based on the remanence physical property of SRAM. This property allows retention of data for at least several minutes even at relatively high temperatures (e.g. 40° C.) and much longer at lower temperatures (e.g. an hour or more at room temperature). Data should be stored initially in the SRAM long enough to trigger remanence. As such, it may not be practical to store non-static data such as continuously-updated time values in a manner that would provide remanence. Instead, in some examples, a timeout value can be stored in eVM SRAM, then compared to a volatile timer, which restarts upon power-up reset, in order to be conservative on time penalty. The hardware may also include integrity protection to (a) resist fault injection attacks, (b) compensate for reliability variations of the SRAM remanence, and (c) correct for errors due to remanence fading after power-loss. Note that the use of the remanence of SRAM in the examples described herein provides a fully digital solution with a relatively small footprint. Alternative eVM implementations described herein that employ on-die capacitors can offer the advantage of providing an indication of the time spent without power (by, e.g., measuring the decay of the capacitors) but may require a relatively significant silicon footprint on the SoC IC die.

Figure 7:
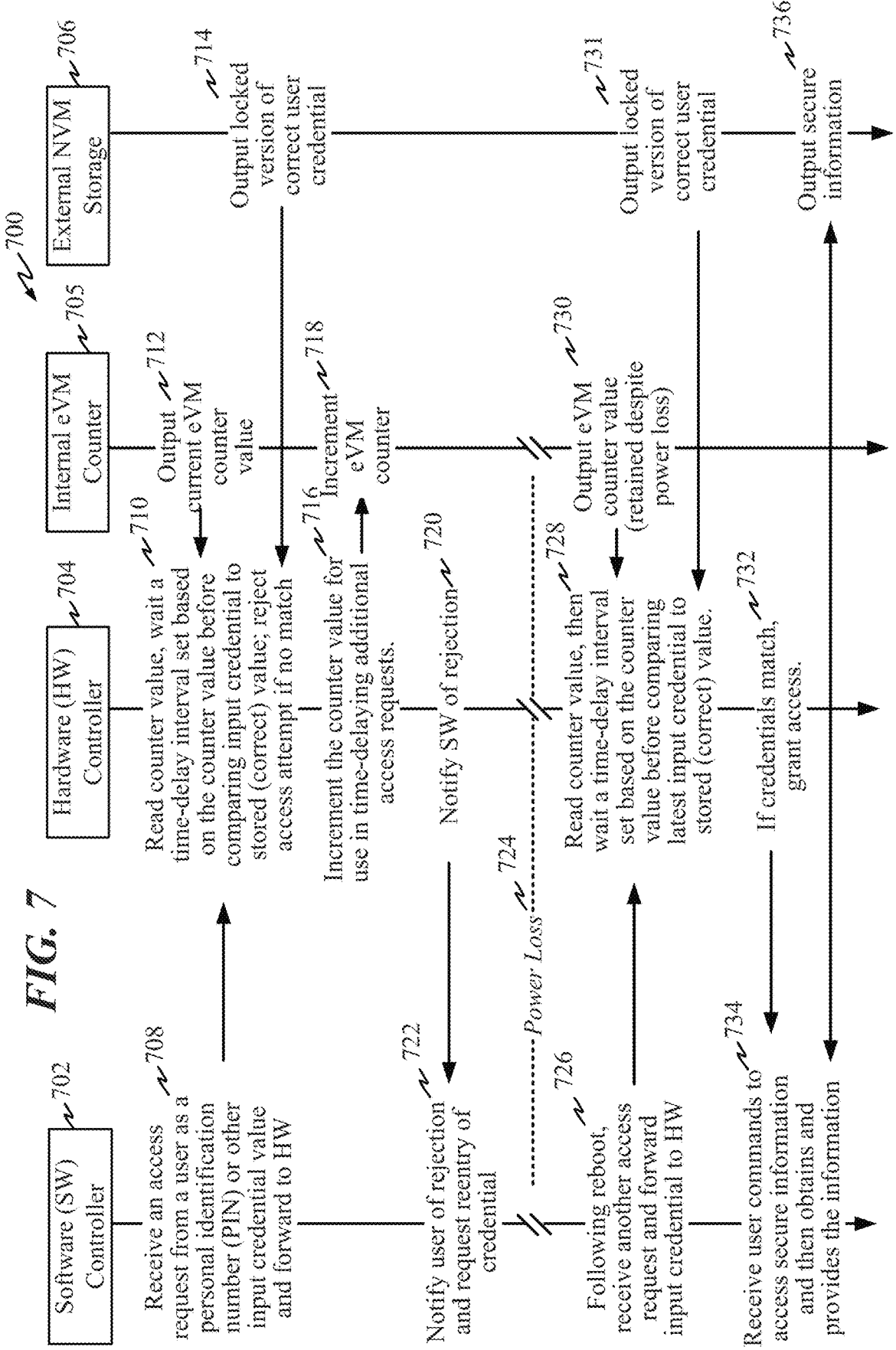
FIG. 7 is a timing diagram summarizing procedures that may be exploited using processor systems employing on-chip (i.e. internal) eVM for storing counter values.

FIG. 7 illustrates some of these features within a timing diagram 700, wherein selected operations are performed by a SW controller 702, a HW controller 704, the internal eVM counter 705 and the external NVM storage 706. At 708, the SW controller receives an access request from a user as a PIN or other input credential value and forwards to the HW. The HW controller, at 710, reads the latest counter value from the internal eVM counter (which is output by the eVM at 712), then waits a time-delay interval set based on the counter value before comparing the input credential to a previously stored (i.e. correct) credential value (obtained from the external NVM at 714) and rejects the access attempt if there is no match. Note that, if the counter is zero, no delay is imposed. Note also that, as explained, hashing techniques and other cryptographic techniques may be applied to encrypt and decrypt the user credential for storage in the off-chip NVM 706. Additionally, a device unique HUK may be used in conjunction with a KDF to generate an end-key, etc. These details are not shown in FIG. 7.

In the example of FIG. 7, the input credential does not match the stored credential and so, at 716 and 718, the HW controller increments the eVM counter. At 720, the HW controller notifies SW of the rejection, which responds, at 722, by notifying the user of the rejection and requesting reentry of the credential. At 724, a power loss occurs, such as might arise if an attacker is attempting to reset device counters to overcome guessing attack countermeasures. At 726, following device reboot, the SW controller 702 receives another access request and forwards the new input credential to HW. The HW controller, at 728, reads the latest counter value (output by the eVM at 730), then waits a time-delay interval set based on the counter value before comparing the latest input credential to the stored (correct) value, obtained from the external NVM, at 731. Since the counter is stored in eVM, it is retained despite the power loss, as already explained. At 732, if credentials match, access is granted and, at 734, the SW receives user commands to access secure information in the external NVM 706 and then obtains the information (which is output from the external NVM at 736) and provides the information to the user (or, as already explained, stores new information provided by the user). Although not shown in FIG. 7, suitable encryption and decryption can be used to secure the user information in the external storage. Also, although not shown, if the latest credential provided by the user at 726 again does not match the correct credential, the eVM counter is again incremented so a further delay can be imposed before yet another user access attempt is processed.

Accordingly, various aspects described herein relate to a SoC device or similar ICs for use with smartphones or other computing devices that are equipped to generate, process, and store pertinent values needed for user privacy—such as security keys and access counters—on the IC, where the values are stored on-die using a combination of NVM and eVM. The IC thus may be equipped with on-die eVM for storing non-static values needed for securing user privacy, such as counters and access time-out values, where the values are retained temporarily by the eVM upon IC power loss. The eVM component of the IC may include a set of on-die capacitors and/or an on-die SRAM (that provides remanence) to temporarily retain the values if the power is disconnected from the IC. The eVM of the IC stores may store counters and/or timeout values employed to control or throttle access attempts. In some examples, a separate NVM portion of the IC permanently stores a device-unique secret key generated locally on the device and not known to anyone, including the chip vendor, the device OEM, and the owner/user of the device. Values may be stored within the eVM of the IC using Hamming or other error-correcting codes (ECCs) to allow recovery of the values even if some bits are lost following power disconnect, and wherein the eVM is suitably isolated from other circuit components to reduce the risk of fault injection or other tampering.

Notably, a full Software-Resilient User Privacy hardware solution (using a combination of eVM and NVM) to store all pertinent values on-chip including the device-specific hardware key removes or substantially reduces the liability of chip vendors and OEMs against providing assistance to third parties for the purpose of breaking or weakening privacy protection, such as if a government agency demands that the chip vendor or OEM provide a means for breaking privacy. In addition, the on-die self-contained implementation eliminates or substantially reduces attack opportunities at the PCB (Printed Circuit Board) level. Note also that this hardware implementation protects the unlocking of user information. The locking of user information (e.g. screen lock after timeout) remains under the control and the responsibility of the system.

Exemplary System-On-a-Chip Hardware Environment

Aspects of the systems and methods described herein can be exploited using a wide variety of mobile devices or other wireless user equipment (UE) devices and for a wide range of applications. To provide a concrete example, an exemplary SoC hardware environment will now be described wherein UE components are provided on a SoC processing circuit for use in a mobile communication device or other access terminal.

Figure 8:
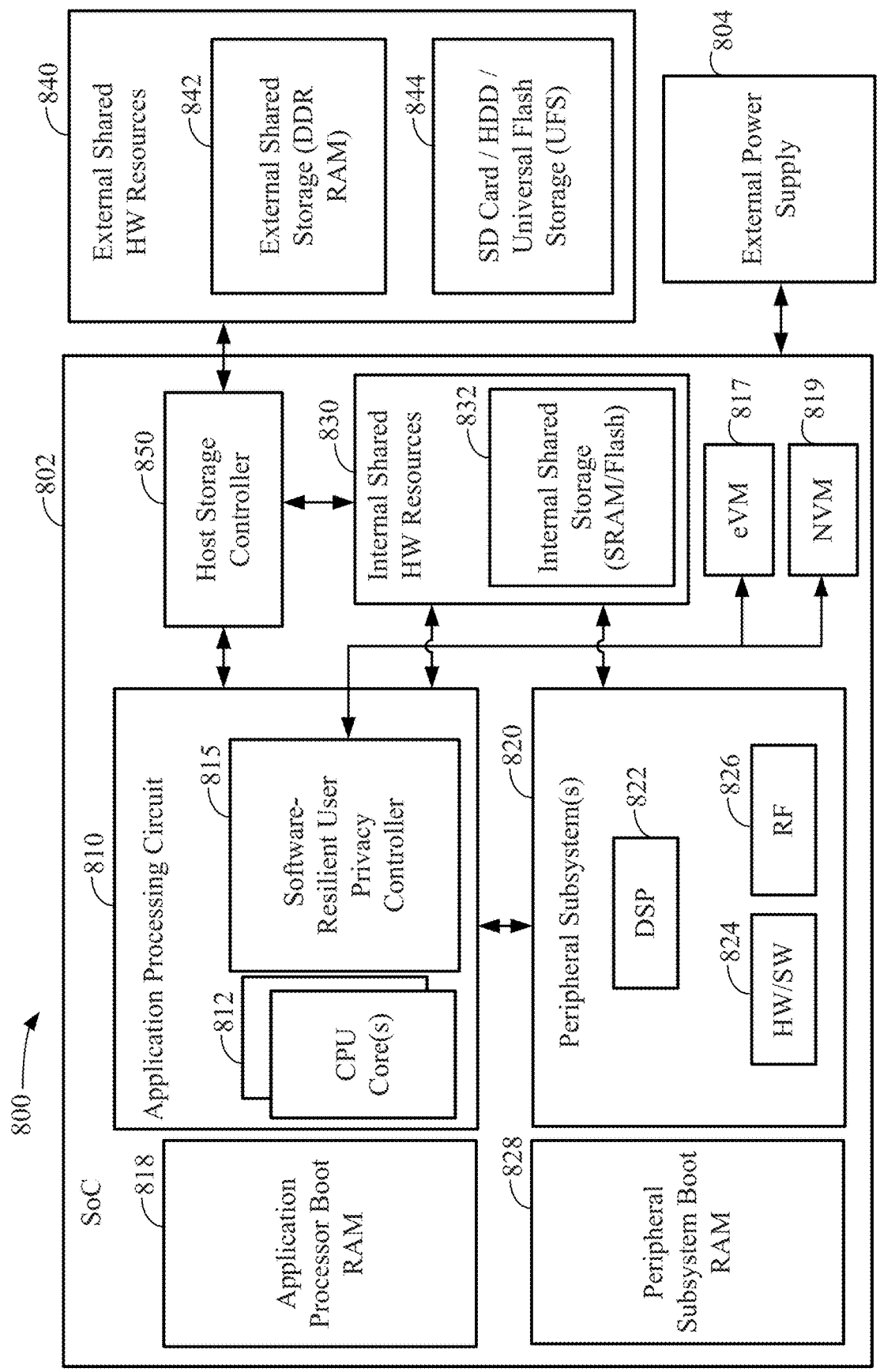
FIG. 8 illustrates in greater detail an exemplary SoC for use in a mobile device user equipment (UE) wherein the SoC includes on-die eVM and NVM.

FIG. 8 illustrates selected components of a UE or other mobile device 800 having a SoC processing circuit 802 configured in accordance with one example where various novel features may be exploited. The SoC processing circuit 802 may be a modified version of a Snapdragon™ processing circuit of Qualcomm Incorporated. The SoC processing circuit 802 receives power from an external power supply 804 and includes an application processing circuit 810, which includes a multi-core CPU 812 and typically controls the operation of all components of the mobile communication device. Note that the external power supply is external to the SoC but is an internal component of the UE 800 and may include, e.g., a rechargeable battery. In the example of FIG. 8, the application processing circuit 810 is equipped to include (or operate in conjunction with) a Software Resilient User Privacy controller 815. Controller 815 may be configured or equipped to perform or control the various privacy-based operations discussed herein, such as controlling the throttling of access attempts to resist guessing attacks by using a counter stored in a eVM storage device 817 of the SoC and/or by generating a device-unique secret key for permanent storage in an NVM storage device 819 of the SoC.

As already noted, the eVM is equipped to temporarily retain values stored therein despite a loss of power to the SoC to help thwart guessing attacks or the like that otherwise might cycle the power to reset or rollback access attempt counters. The eVM 817 may be suitably isolated from other circuit components to reduce the risk of fault injection or other forms or tampering by, e.g., physically and/or logically isolating the eVM from other circuit components using circuit component isolation techniques that may be otherwise conventional. Both logical and physical isolation techniques may be employed in some examples. Note also that various other passwords, certificates or private keys may be stored within an internal shared storage device 832 that is separate from the eVM and the NVM.

In the example of FIG. 8, the application processing circuit 810 is also coupled to a host storage controller 850 for controlling storage of data in the internal shared storage device 832 that forms part of internal shared hardware (HW) resources 830. The application processing circuit 810 may also include a boot RAM or ROM 818 that stores boot sequence instructions for the various components of the SoC processing circuit 802. The SoC processing circuit 802 further includes one or more peripheral subsystems 820 controlled by application processing circuit 810. The peripheral subsystems 820 may include but are not limited to a storage subsystem (e.g., read-only memory (ROM), random access memory (RAM)), a video/graphics subsystem (e.g., digital signal processing circuit (DSP), graphics processing circuit unit (GPU)), an audio subsystem (e.g., DSP, analog-to-digital converter (ADC), digital-to-analog converter (DAC)), a power management subsystem, security subsystem (e.g., encryption components and digital rights management (DRM) components), an input/output (I/O) subsystem (e.g., keyboard, touchscreen) and wired and wireless connectivity subsystems (e.g., universal serial bus (USB), Global Positioning System (GPS), Wi-Fi, Global System Mobile (GSM), Code Division Multiple Access (CDMA), 4G Long Term Evolution (LTE) modems). The exemplary peripheral subsystem 820, which is a modem subsystem, includes a DSP 822, various other hardware (HW) and software (SW) components 824, and various radio-frequency (RF) components 826. In one aspect, each peripheral subsystem 820 also includes a boot RAM or ROM 828 that stores a primary boot image (not shown) of the associated peripheral subsystems 820. As noted, the SoC processing circuit 802 further includes various internal shared HW resources 830, such as the aforementioned internal shared storage 832 (e.g. static RAM (SRAM), flash memory, etc.), which is shared by the application processing circuit 810 and the various peripheral subsystems 820 to store various runtime data or other parameters and to provide host memory and which may store various keys or passwords for secure processing.

In one aspect, the components 810, 817, 818, 819, 820, 828, 830 and 850 of the SoC 802 are integrated on a single-chip substrate. The SoC processing circuit 802 further includes various external shared HW resources 840, which may be located on a different chip substrate and may communicate with the SoC processing circuit 802 via one or more buses. External shared HW resources 840 may include, for example, an external shared storage 842 (e.g. double-data rate (DDR) dynamic RAM) and/or permanent or semi-permanent data storage 844 (e.g., a secure digital (SD) card, hard disk drive (HDD), an embedded multimedia card, a universal flash device (UFS), etc.), which may be shared by the application processing circuit 810 and the various peripheral subsystems 820 to store various types of data, such as an operating system (OS) information, system files, programs, applications, user data, audio/video files, etc. When the UE incorporating the SoC processing circuit 802 is activated, the SoC processing circuit begins a system boot up process in which the application processing circuit 810 may access boot RAM or ROM 818 to retrieve boot instructions for the SoC processing circuit 802, including boot sequence instructions for the various peripheral subsystems 820. The peripheral subsystems 820 may also have additional peripheral boot RAM or ROM 828.

Exemplary Components

Figure 9:
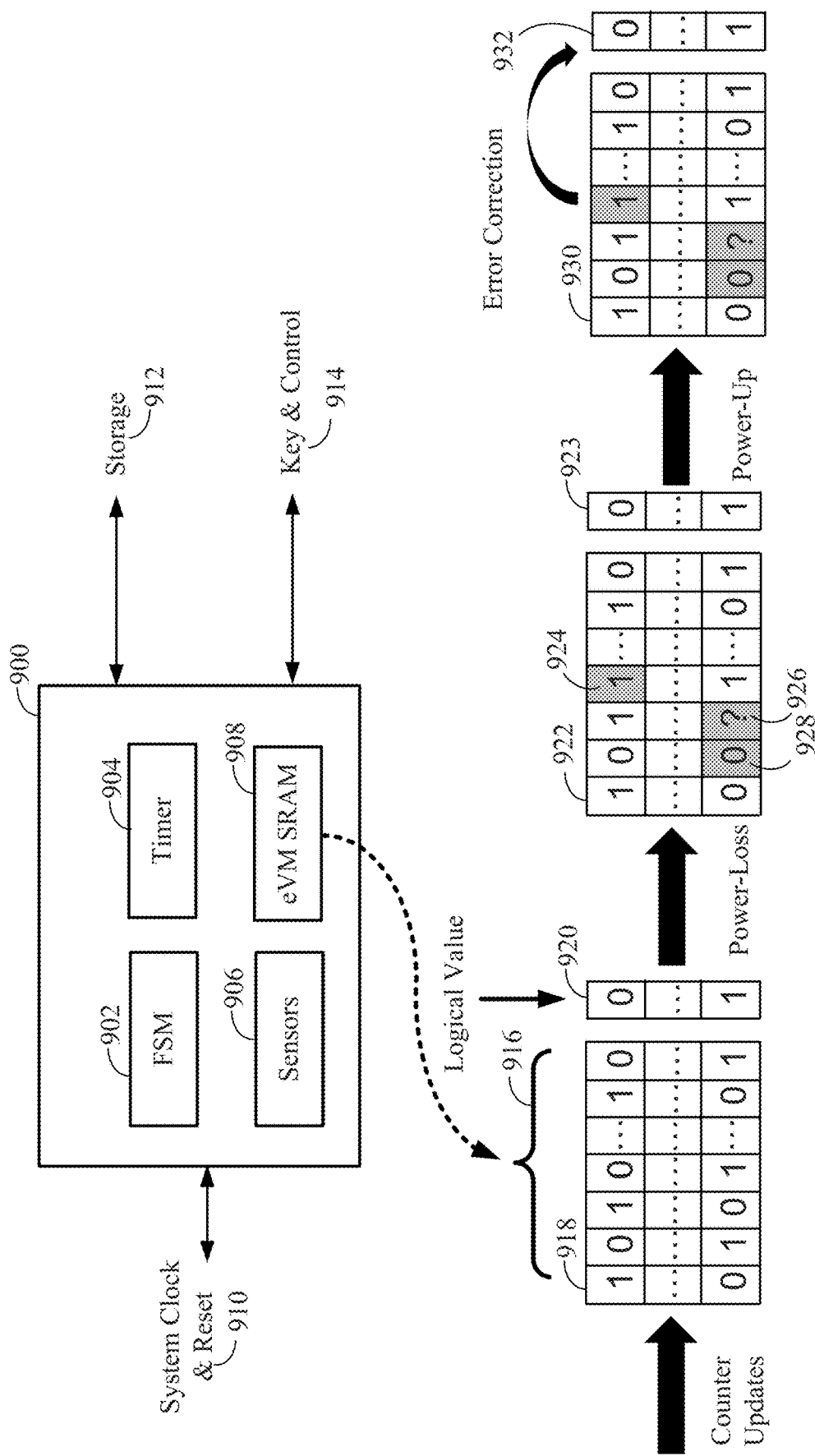
FIG. 9 illustrates exemplary functional components of the SoC of FIG. 8 and, in particular, illustrates Error Correcting Codes applied to values stored in the eVM.

FIG. 9 illustrates exemplary components of the SoC of FIG. 7 or other hardware-based devices that may be equipped to implement Software Resilient User Privacy. Within FIG. 7, a HW device 900 includes a finite state machine (FSM) 902 that operates to control a timer 904, one or more anti-tampering sensors 906 and an SRAM 908 that provides sufficient remanence to temporarily retain counter values despite power loss to the HW device 900. The anti-tampering sensors 906 may provide, e.g., one or more digital fault sensors that analyze clock signals, voltage fluctuations, temperature fluctuations, etc. The HW device 900 may represent a portion of a UE SoC. System clock signals and reset values may be input into HW device 900 from other components of the UE SoC via input lines 910. The HW device 900 accesses other storage components (such as an NVM, not shown in FIG. 9) via connection line 912 and sends/receives various privacy key values and/or control values via connection lines 914.

The SRAM 908 provides ephemeral retention of access attempt counter values, parameters or other information stored therein post power-loss. As noted above, the remanent capability to retain information despite power loss may decrease at higher temperatures down to minutes. Yet, retention of access attempt counter values for only several minutes (e.g. five minutes) may be sufficient to discourage guessing attacks, where attackers would seek to reapply PIN code guesses more frequently in an attempt to more promptly find the PIN code to access the device. As noted above, ECC may be employed to compensate for remanence fading after power-loss to extend the time during which counter values can be effectively retained. Note also that ECC values may be helpful to compensate for process/reliability variations in the chip itself to thereby more reliably retain counter values or other parameters via remanence.

Within FIG. 9, a portion 916 of SRAM 908 is shown for storing a set of bits 918 corresponding to a counter value, along with logical values 920 to provide a degree of error correction (via ECC Hamming codes or the like). The same portion of SRAM is during post-power loss via memory registers 922 and logic bit 923, wherein one of the bits 924 has been flipped resulting in an ambiguous read bit 926 and an incorrect read bit 928. The same portion of SRAM is then shown yet again following power up as a set of bits 930, wherein ECC procedures can be used to detect and correct the incorrect or ambiguous bits using logic values 932. As already explained, the counter value may then be used by other components of the device to trigger an increase is the time delay imposed before another PIN code can be applied to the system. With each incorrect PIN code, the time penalty increases, thereby discouraging guessing attacks. Note that FIG. 9 illustrates a full dual-redundancy ECC. Logic 1 is encoded as "0101 . . . 01" and logic 0 is encoded as "1010 . . . 10". So, the Hamming distance between the two values is the width of the vector.

Legacy Integration

Figure 2:
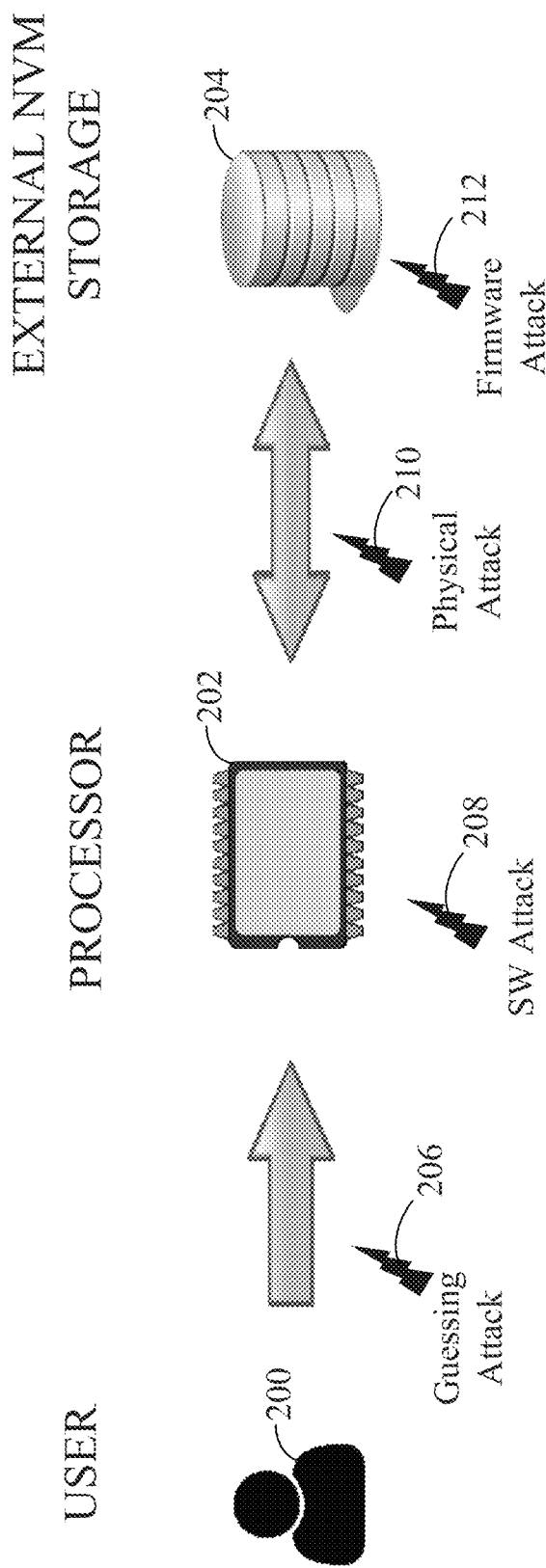
FIG. 2 illustrates the exemplary computing system of FIG. 1 and various attacks that may be directed at gaining unauthorized access to the confidential user information.
Figure 3:
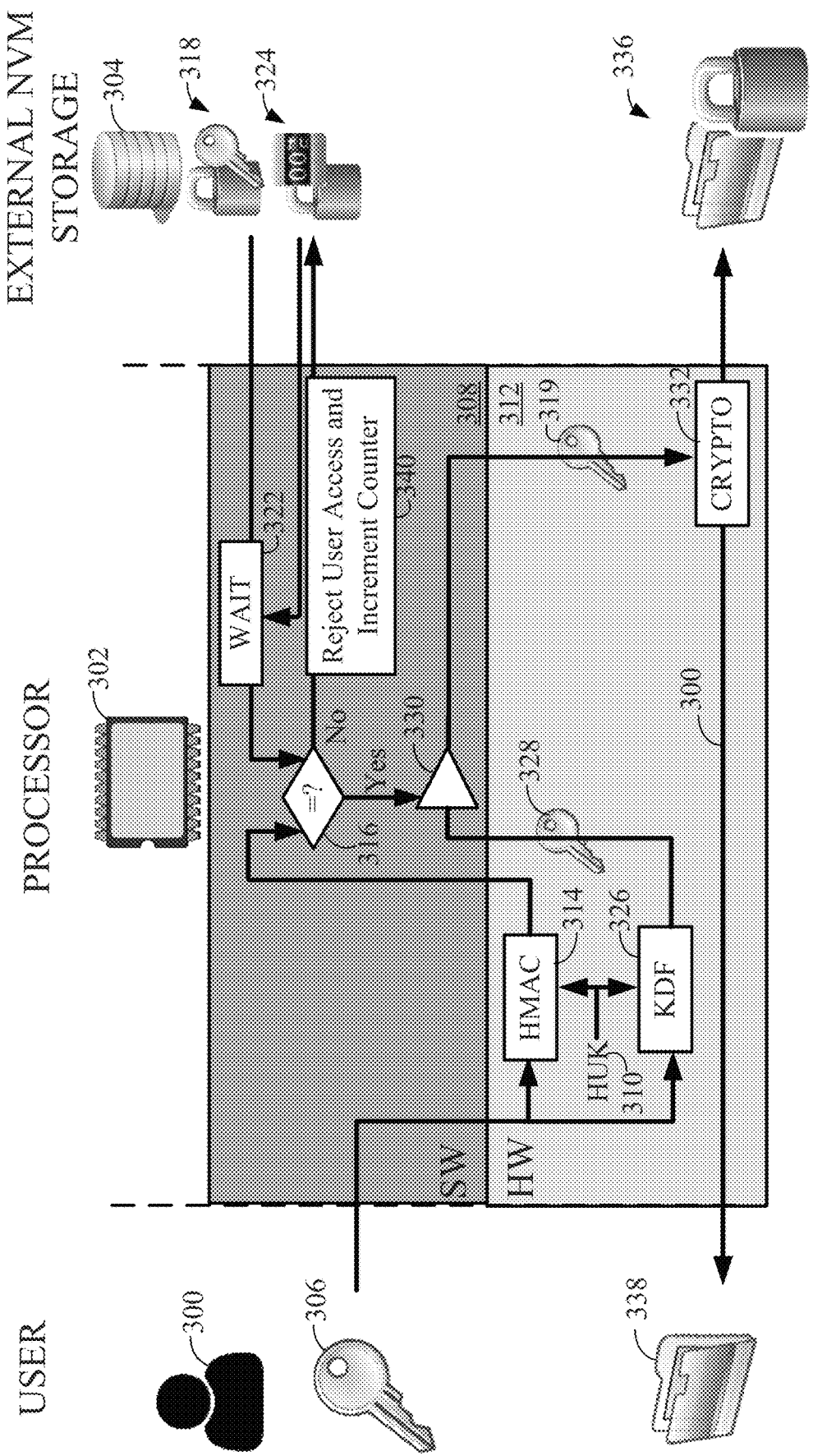
FIG. 3 illustrates the exemplary computing system of FIG. 1 and summarizes a procedure for authenticating the user before confidential user information may be accessed, wherein conventional time-delay countermeasures are applied.

In some examples, the HW-based Software Resilient User Privacy components described herein may be integrated with legacy privacy components, i.e. preexisting SW and HW components of the type shown in FIGS. 1-3.

Figure 10:
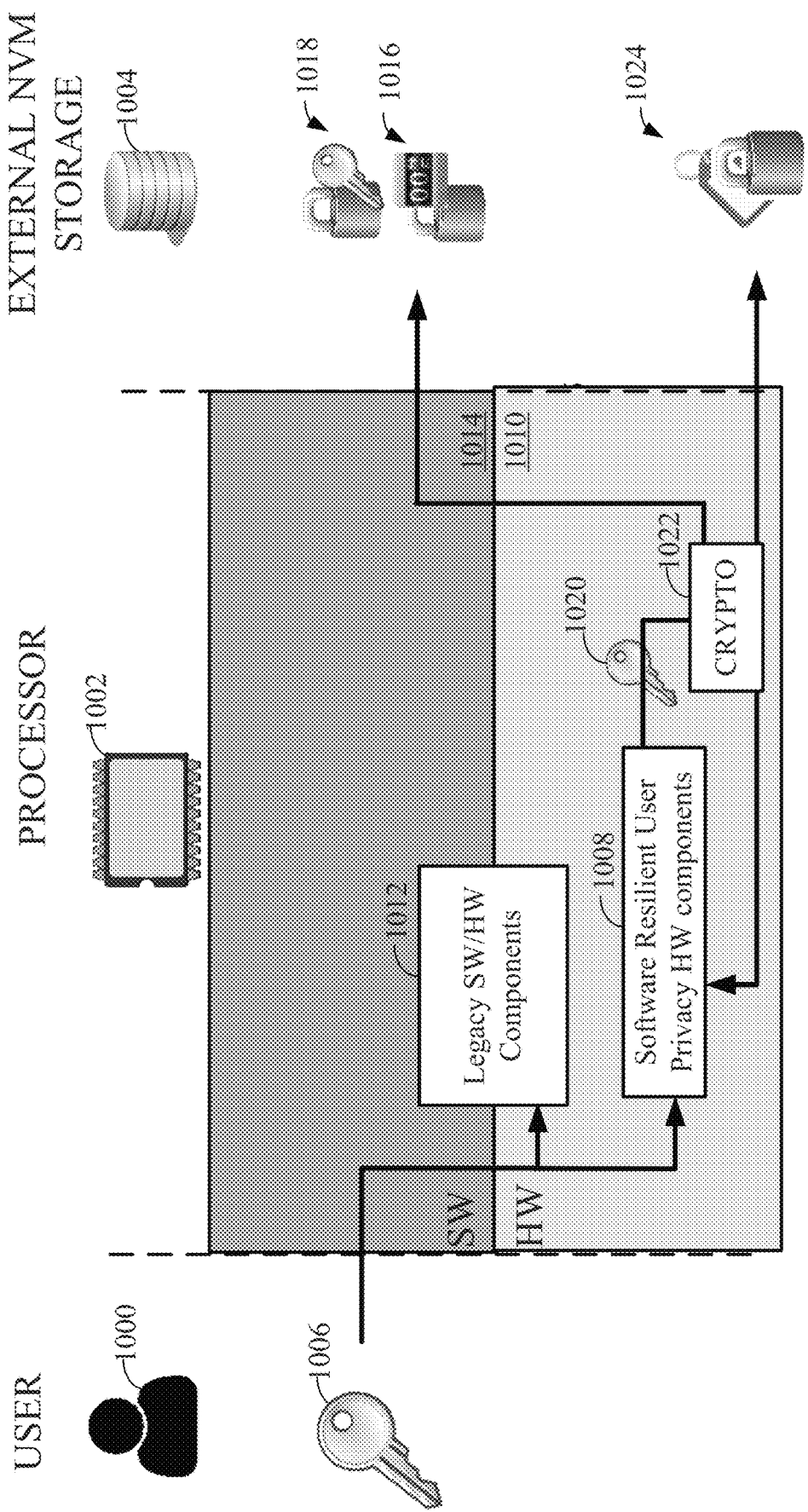
FIG. 10 illustrates an alternative example of a system wherein legacy SW/HW components are retained along with added HW components for providing countermeasures that exploit the eVM.

FIG. 10 summarizes the integration of HW-based Software Resilient User Privacy components with legacy privacy components. That is, FIG. 10 illustrates an exemplary hybrid system and procedure for cryptographically protecting information associated with a user 1000, which is encrypted by a processor 1002 for storage in a database 1004 (external to the processor yet within the wireless device that employs the processor). In this example, the processor 1002 includes Software Resilient User Privacy components 1008 within HW 1010 that exploit eVM (such as the HW-based components of FIG. 6, discussed above) and combined HW/SW components 1012 (such as the legacy components of FIG. 3 that include some HW and some SW components).

Briefly, during an enrollment procedure, a relatively short user PIN or other passcode 1006 is selected by the user and entered via the legacy SW/HW components 1012 (some of which runs in SW 1014) to permit legacy privacy operations, including operations where at least some counters 1016 are stored in the external storage 1004 (particularly any counters not susceptible to rollback or reset attacks). The legacy components 1012 may also be used to store an encrypted version of the PIN on the external memory as locked key 1018. The PIN is also applied to HW-based components 1008, which may store other counters within an internal eVM (not shown in FIG. 10), particularly counters that might otherwise be susceptible to reset attacks. The HW-based components 1008 generate an end-key 1020, which may be used by a cryptographic device 1022 to encrypt data for storage as locked data 1024 on the external storage device 1004 (or for decrypting that data later). An HMAC, not shown in FIG. 10, may also be used to generate hash tags or the like for use in secure stored data or stored keys, as shown and discussed above.

Among other features of the exemplary system and procedure of FIG. 10 (and other examples described herein), the system and procedure: 1) removes or reduces the liability of chip vendors and OEMs against providing assistance to third party for the purpose of weakening privacy protection (such as government agencies that might otherwise demand that the chip vendor provide tools for breaking its own encryption; 2) eliminates or reduces attack opportunities at printed circuit board (PCB) level; 3) provides a relatively small silicon footprint implementation (particularly when using eVM in the form of SRAM) and 4) can operate along with a front-end of legacy architecture (as shown in FIG. 10).

Exemplary Systems and Methods

Figure 11:
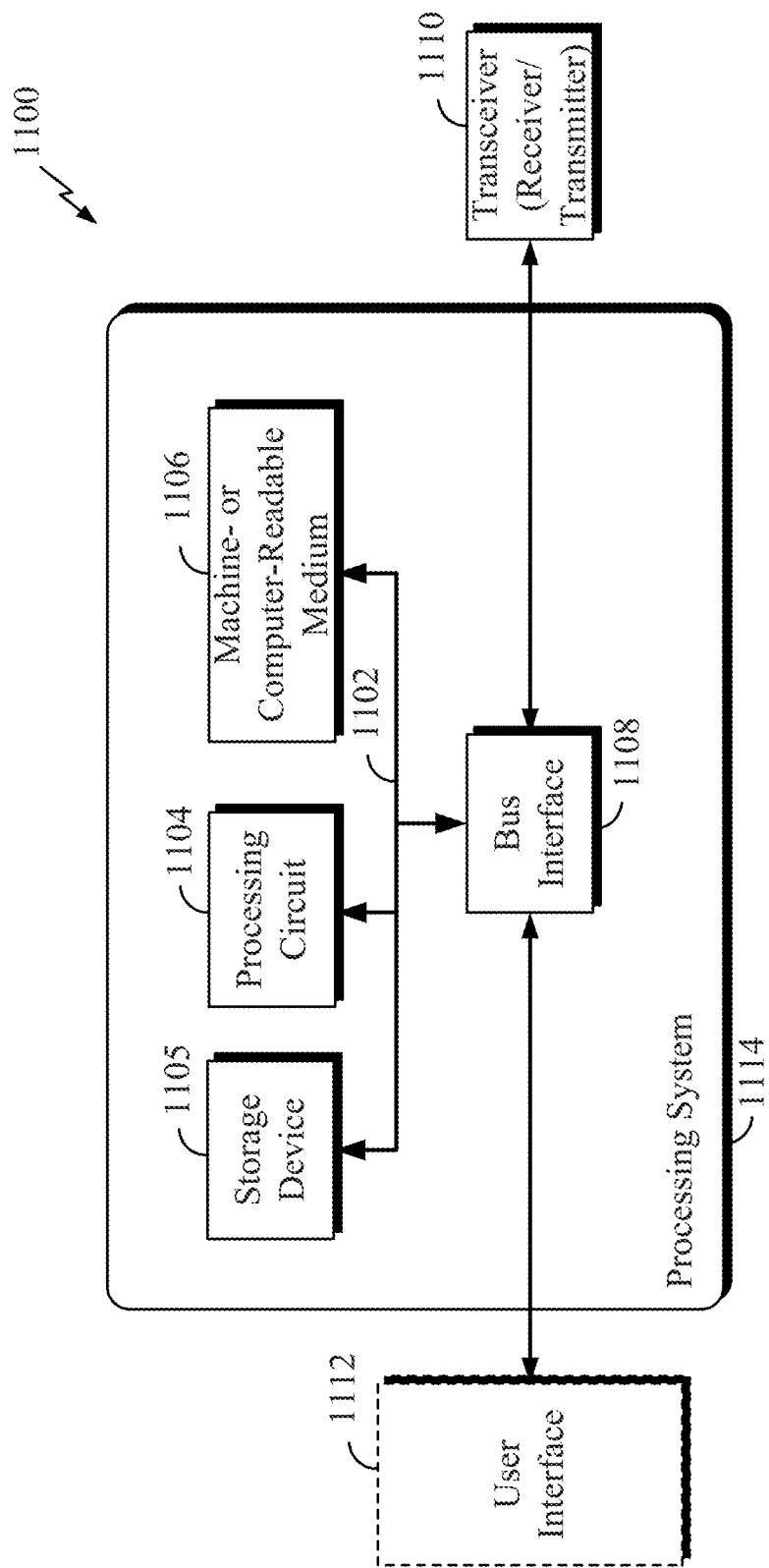
FIG. 11 is a block diagram illustrating an example of a hardware implementation for an apparatus employing a processing system that may exploit the systems, methods and apparatus of FIGS. 4-10.

FIG. 11 illustrates an overall system or apparatus 1100 in which the systems, methods and apparatus of FIGS. 4-10 may be implemented. In accordance with various aspects of the disclosure, an element, or any portion of an element, or any combination of elements may be implemented with a processing system 1114 that includes one or more processing circuits 1104 such as the SoC processing circuit of FIG. 10. For example, apparatus 1100 may be a UE of a mobile communication system. Apparatus 1100 may be used with a radio network controller (RNC). In addition to an SoC, examples of processing circuits 1104 include microprocessing circuits, microcontrollers, DSPs, field programmable gate arrays (FPGAs), programmable logic devices (PLDs), state machines, gated logic, discrete hardware circuits, and other suitable hardware configured to perform the various functionality described throughout this disclosure. That is, the processing circuit 1104, as utilized in the apparatus 1100, may be used to implement any one or more of the processes described above and illustrated in FIGS. 4, 5, 6, 7, 8, 9 and 10 (and those illustrated in FIGS. 12, 13 and 14, discussed below).

In the example of FIG. 11, the processing system 1114 is implemented with a bus architecture, represented generally by the bus 1102. The bus 1102 may include any number of interconnecting buses and bridges depending on the specific application of the processing system 1114 and the overall design constraints. The bus 1102 links various circuits including one or more processing circuits (represented generally by the processing circuit 1104), the storage device 1105, and a machine-readable, processor-readable, processing circuit-readable or computer-readable media (represented generally by a non-transitory machine-readable medium 1106) The bus 1102 may also link various other circuits such as timing sources, peripherals, voltage regulators, and power management circuits, which are well known in the art, and therefore, will not be described any further. The bus interface 1108 provides an interface between bus 1102 and a transceiver 1110, i.e. a receiver/transmitter. The transceiver 1110 provides a means for communicating with various other apparatus over a transmission medium. Depending upon the nature of the apparatus, a user interface 1112 (e.g., keypad, display, speaker, microphone, joystick) may also be provided.

The processing circuit 1104 is responsible for managing the bus 1102 and for general processing, including the execution of software stored on the machine-readable medium 1106. The software, when executed by processing circuit 1104, causes processing system 1114 to perform the various functions described herein for any particular apparatus. Machine-readable medium 1106 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1106. The machine-readable medium 1106 may be a non-transitory machine-readable medium or computer-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer.

Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction (s) and/or data.

Hence, in one aspect of the disclosure, processing circuit 1104 illustrated in FIG. 11 may be a specialized processing circuit (e.g., an application specific integrated circuit (ASIC)) that is specifically designed and/or hard-wired to perform the algorithms, methods, and/or blocks described in FIGS. 4, 5, 6, 7, 8, 9 and 10 (and/or FIGS. 12, 13, and 14, discussed below). Thus, such a specialized processing circuit (e.g., ASIC) may be one example of a means for executing the algorithms, methods, and/or blocks described in FIGS. 4, 5, 6, 7, 8, 9 and 10 (and/or FIGS. 12, 13, and 14, discussed below). The machine-readable storage medium may store instructions which when executed by a specialized processing circuit (e.g., ASIC) causes the specialized processing circuit to perform the algorithms, methods, and/or blocks described herein.

The machine-readable medium 1106 may reside in the processing system 1114, external to the processing system 1114, or distributed across multiple entities including the processing system 1114. The machine-readable medium 1106 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 1106 may have one or more instructions which when executed by the processing circuit 1104 (formed, e.g., on an IC die) causes the processing circuit to: store a parameter in a eVM on the IC die, wherein the eVM receives power from a power source; retrieve the parameter from the eVM after reactivation of power following a loss of power from the power source; and control a power-cycling attack countermeasure based on the parameter retrieved from the eVM following the reactivation of power, using techniques already described.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a DSP, an ASIC, FPGA or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Figure 12:
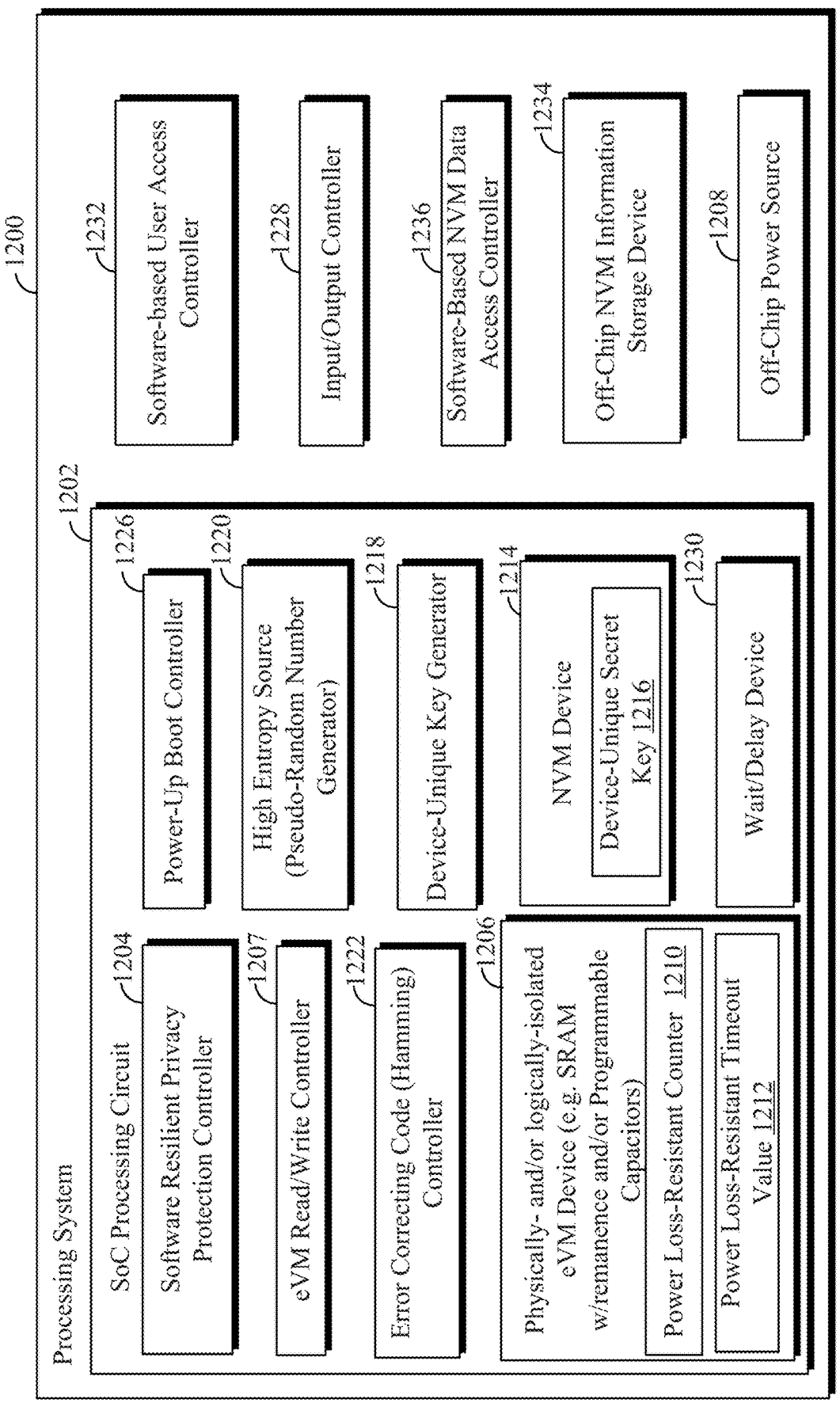
FIG. 12 is a block diagram illustrating exemplary components of a computing and/or processing system equipped with components configured to exploit an on-chip eVM device to provide Software Resilient Privacy.

FIG. 12 illustrates selected and exemplary components of a processing system 1200 (for a UE or other device) having a SoC processing circuit 1202 with HW various components equipped to perform the various Software Resilient Privacy Protection operations discussed above. In particular, a Software Resilient Privacy Protection controller 1204 is operative to control Software Resilient Privacy Protection operations by, for example, controlling operations to store parameters or other information in an on-chip eVM device 1206 using a eVM Read/Write Controller 1207 and to then retrieve the parameters or other information from the eVM, even after a power loss (where power provided by an off-chip power source 1208 is deactivated from the SoC 1202). The on-chip eVM 1206, which can be configured, e.g., as an SRAM with remanence and/or a set of programmable capacitors, may store or comprise a power loss-resistance counter 1210 and/or a power loss-resistant timeout value 1212. As discussed above, the eVM device may be physically- and/or logically-isolated from other SoC components to resist fault injection or tampering.

The configuration of the eVM Read/Write Controller 1207 may depend on the particular eVM employed within the device. If the eVM is an SRAM, the Read/Write Controller 1207 may include an otherwise conventional write controller to store data in the SRAM but modified, if needed, to ensure or provide that the parameters written therein are stored long enough to achieve sufficient remanence so as to retain the values following power-cycling for a sufficient amount to time based on any operational parameters or requirements of the device (e.g. based on expected device temperatures and based on the expected time-delay for power-cycling, etc.). For example, based on the security requirements of the device, the read/write controller 1207 and the SRAM 1206 may be configured to store parameters so that they will be retained for at least one hour at room temperature despite power loss.

For SRAM read operations, the eVM Read/Write Controller 1207 may include an otherwise conventional read controller to read data from the SRAM. Note that the Read/Write Controller 1207 may be designed to take into account a particular ECC procedure, such as a Hamming procedure, that is controlled by an ECC controller 1222. In this regard, the more robust the ECC, the greater the amount of bit fading that can be tolerated within the eVM. That is, with ECC, not all bits of the parameter stored in the eVM need be reliably retrieved from eVM since the missing bits can be corrected via ECC. Hence, bits may be stored in the SRAM for a shorter amount of time prior to power loss while still achieving sufficient remanence to reconstruct the value parameter via ECC despite the fading of some of the individual bits. Similarly, bits may be retrieved from the SRAM over a greater power-cycling interval or at higher temperatures, while still reconstructing the value of the stored parameter via ECC despite the fading of some of the individual bits.

SoC processing circuit 1202 also includes an on-chip NVM device 1214 that stores a device-unique secret key 1216 or HUK. The device-unique key may be generated initially by a device-unique key generator 1218 based, at least in part, on values obtained from a high entropy source 1220, which may include or comprise a pseudo-random number generator (PRNG). Boot functions are controlled by a power-up boot controller 1226. Following a power loss, the processing system reboots and then, upon entry of a user credential via an input/output controller 1228, the counter value retained in the eVM is used to set a wait interval for delaying processing of the user credential. A wait/delay device 1230 may control the delay, as already explained, by using a structurally slow algorithm, the duration of which can be increased or otherwise controlled based on the counter value in the eVM or by the value of timeout value 1212.

Software operations that involve user access may be controlled by a SW-based user access controller 1232 using data stored in an off-chip NVM information storage device 1234 under the control of a SW-based NVM data access controller 1236. Note that the HW-based components may also access the off-chip NVM, as needed, using a flash controller (not shown in FIG. 12) or the like. Numerous other SW and HW components may be provided, which for brevity and clarity are not shown in FIG. 12.

Figure 13:
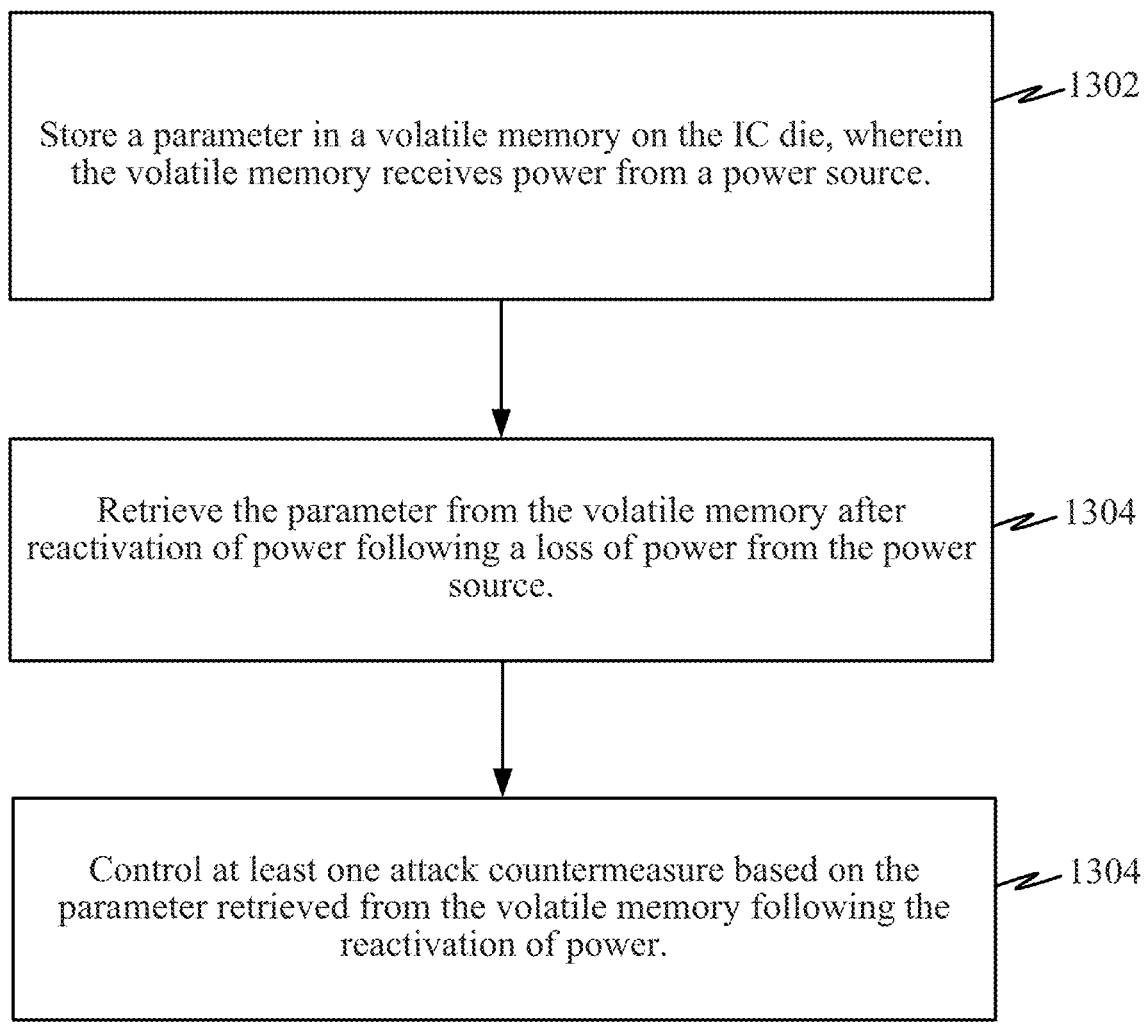
FIG. 13 summarizes exemplary procedures that exploit an on-chip eVM.

FIG. 13 broadly illustrates and summarizes methods or procedures 1300 that may be performed by suitably equipped devices or components, such as the processor discussed above that is formed on an IC die and is subject to an attack that exploits power-cycling. Briefly, at 1302, the processor stores a parameter in a volatile memory on the IC die (such as an eVM), wherein the volatile memory receives power from a power source. At 1304, the processor retrieves the parameter from the volatile memory after reactivation of power following a loss of power from the power source. At 1306, the processor controls at least one attack countermeasure based on the parameter retrieved from the volatile memory following the reactivation of power, using techniques already described in detail.

FIG. 14 further illustrates and summarizes methods or procedures 1400 that may be performed by suitably equipped devices or components, such as the processor discussed above. At 1402, the processor generates a device-unique secret key and stores the key in an NVM portion of memory on the IC die, the device-unique secret key not accessible to any entity or component external to the IC die and wherein software running on the processor has no access to the device-unique secret key. At 1404, the processor receives an access request from a user as a PIN or other credential value, compares the input value with a stored (correct) value and, if no match, rejects the access attempt and increments a counter value for use in time-delaying additional access requests and/or initiate a timer (or grants access to the user is there is a match between the input credential and the stored value). At 1406, if no match, the processor encodes the counter and/or timer parameters as binary codes using Hamming or other ECCs and stores the parameter within a VM providing ephemeral post-power loss data retention (i.e. an eVM aka a pNVM) on a SoC IC die wherein the IC die receives power from an external power supply and the eVM includes (1) SRAM configured to provide a sufficient amount of capacitive (and/or magnetic) remanence to retain stored parameters or other information following the power loss during a predetermined period of time, and/or (2) a set of capacitors formed on the IC die and configured to store parameters or other information therein.

At 1408, the processor receives another access request following a power loss to the IC die. At 1410, the processor retrieves parameters from the eVM following the power loss during a period of time in which the information is still retained in the memory device via capacitive remanence within the SRAM and/or via charge retained within the set of capacitors, while using ECC to detect and correct possible bit errors, then delays responding to the latest access attempt (received at 1402) until completion of a delay specified by the timer/counter value. At 1412, once there is a match (i.e. successful authentication), the processor generates an end-key from the device-unique secret key for loading into a crypto block, which then releases the content of the NVM to software. See above for details regarding exemplary implementations.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that, generally speaking, logical blocks, modules, circuits, and algorithm steps may be implemented as electronic hardware, computer software, or combinations of both. To clearly illustrate this interchangeability of hardware and software, which may be appropriate in some cases depending upon the particular function, various illustrative components, blocks, modules, circuits, and steps have been described above generally in terms of their functionality. Whether such functionality is implemented as hardware or software depends upon the particular application and design constraints imposed on the overall system. In particular, as already explained, certain components should be implemented entirely in HW to provide for effective SW resiliency.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a processor formed on an integrated circuit (IC) die, the method comprising:
    storing a parameter in a volatile memory on the IC die, wherein the volatile memory receives power from a power source, the parameter stored using a storage controller configured to store the parameter in the volatile memory for an amount of time to achieve an amount of remanence to retain the parameter ephemerally following a loss of power at the volatile memory, with the amount of time set based, at least in part, on an expected interval of the loss of power, wherein the volatile memory is a static random access memory (SRAM) capable of providing the amount of remanence to retain the parameter ephemerally following the loss of power during the period of time;
    retrieving the parameter from the volatile memory following the loss of power at the volatile memory during which the volatile memory receives no power; and
    controlling an attack countermeasure based on the parameter retrieved from the volatile memory following a reactivation of power, wherein the parameter represents a power-loss resistant value used in connection with the attack countermeasure.

2. The method of claim 1, wherein the remanence of the volatile memory is one or more of capacitive remanence and magnetic remanence.

3. The method of claim 1, wherein the attack countermeasure comprises delaying a user access attempt based on a value of the parameter.

4. The method of claim 1, wherein the parameter is stored in the volatile memory using error-correcting codes (ECCs).

5. The method of claim 1, further including generating a device-unique secret key using the processor of the IC die and storing the device-unique secret key in a non-volatile memory (NVM) portion of memory on the IC die, the device-unique secret key not accessible to any entity or component external to the IC die.

6. The method of claim 5, wherein software running on the processor lacks access to the device-unique secret key and wherein hardware components of the processor generate an end-key from the device-unique secret key.

7. A device, comprising:
    a power source; and
    an integrated circuit (IC) die including a processor and a volatile memory configured to receive power from the power source, the processor configured to
    store a parameter in the volatile memory on the IC die using a storage controller configured to store the parameter in the volatile memory for an amount of time to achieve an amount of remanence to retain the parameter ephemerally following a loss of power at the volatile memory, with the amount of time set based, at least in part, on an expected interval of the loss of power, wherein the volatile memory is a static random access memory (SRAM) capable of providing the amount of remanence to retain the parameter ephemerally following the loss of power during the period of time;
    retrieve the parameter from the volatile memory following a loss of power at the volatile memory during which the volatile memory receives no power; and
    control an attack countermeasure based on the parameter retrieved from the volatile memory following a reactivation of power, wherein the parameter represents a power-loss resistant value used in connection with the attack countermeasure.

8. The device of claim 7, wherein the remanence is one or more of capacitive remanence and magnetic remanence.

9. The device of claim 7, wherein the attack countermeasure comprises delaying a user access attempt based on a value of the parameter.

10. The device of claim 7, wherein the parameter is stored by the processor in the volatile memory using error-correcting codes (ECCs).

11. The device of claim 7, further including generating a device-unique secret key using the processor of the IC die and storing the device-unique secret key in a non-volatile memory (NVM) portion of memory on the IC die, the device-unique secret key not accessible to any entity or component external to the IC die.

12. The device of claim 11, wherein software running on the processor lacks access to the device-unique secret key and wherein hardware components of the processor generate an end-key from the device-unique secret key.

13. A device comprising:
    means for storing a parameter in a volatile memory on an integrated circuit (IC) die, wherein the volatile memory receives power from a power source, the means for storing the parameter in the volatile memory for an amount of time to achieve an amount of remanence to retain the parameter ephemerally following a loss of power at the volatile memory, with the amount of time set based, at least in part, on an expected interval of the loss of power, wherein the volatile memory is a static random access memory (SRAM) capable of providing the amount of remanence to retain the parameter ephemerally following the loss of power during the period of time;
    means for retrieving the parameter from the volatile memory following a loss of power at the volatile memory during which the volatile memory receives no power; and
    means for controlling an attack countermeasure based on the parameter retrieved from the volatile memory following a reactivation of power, wherein the parameter represents a power-loss resistant value used in connection with the attack countermeasure.

14. The device of claim 13, wherein the remanence is one or more of capacitive remanence and magnetic remanence.

15. The device of claim 13, wherein the means for controlling the attack countermeasure comprises means for delaying a user access attempt based on a value of the parameter.

16. The device of claim 13, wherein the parameter is stored in the volatile memory using error-correcting codes (ECCs).

17. The device of claim 13, further including means for generating a device-unique secret key using the processor of the IC die and means for storing the device-unique secret key in a non-volatile memory (NVM) portion of memory on the IC die, the device-unique secret key not accessible to any entity or component external to the IC die.

18. The method of claim 1, wherein the parameter is retrieved using a read controller configured to read information retained ephemerally within the volatile memory despite the power loss to the volatile memory.

19. The method of claim 1, further comprising: receiving an access request from a user following the loss of power; and
    delaying responding to the access request based on a delay value derived from the parameter retrieved from the volatile memory following the loss of power.

20. The method of claim 1, wherein the parameter is stored in the volatile memory for an amount of time set based on one or more of an expected device temperature and an expected time-delay for power-cycling.

21. The device of claim 7, wherein the processor is further configured to retrieve the parameter using a read controller configured to read information retained ephemerally within the volatile memory despite the power loss to the volatile memory.

22. The device of claim 7, wherein the processor is further configured to:
    receive an access request from a user following the loss of power; and
    delay responding to the access request based on a delay value derived from the parameter retrieved from the volatile memory following the loss of power.

23. The device of claim 7, wherein the processor is further configured to store the parameter in the volatile memory for an amount of time set based on one or more of an expected device temperature and an expected time-delay for power-cycling.

24. The device of claim 13, further comprising: means for receiving an access request from a user following the loss of power; and means for delaying responding to the access request based on a delay value derived from the parameter retrieved from the volatile memory following the loss of power.

25. The device of claim 13, wherein the means for storing the parameter in the volatile memory is configured to store the parameter for an amount of time set based on one or more of an expected device temperature and an expected time-delay for power-cycling.

26. The method of claim 20, wherein the amount of time is set based on both the expected time-delay for power-cycling and the expected device temperature.

27. The device of claim 23, wherein the processor is further configured to set the amount of time based on both the expected time-delay for power-cycling and the expected device temperature.

* * * * *